(12) United States Patent
Qu

(10) Patent No.: US 9,998,315 B2
(45) Date of Patent: Jun. 12, 2018

(54) METHOD AND APPARATUS FOR I-Q DECOUPLED OFDM MODULATION AND DEMODULATION

(71) Applicant: BlackBerry Limited, Waterloo (CA)

(72) Inventor: Shouxing Qu, Gloucester (CA)

(73) Assignee: BlackBerry Limited, Waterloo (CA)

( * ) Notice: Subject to any disclaimer, the term of this patent is extended or adjusted under 35 U.S.C. 154(b) by 0 days. days.

(21) Appl. No.: 15/063,954

(22) Filed: Mar. 8, 2016

(65) Prior Publication Data
US 2017/0264477 A1 Sep. 14, 2017

(51) Int. Cl.
*H04L 27/26* (2006.01)

(52) U.S. Cl.
CPC ........ *H04L 27/2634* (2013.01); *H04L 27/265* (2013.01); *H04L 27/2637* (2013.01)

(58) Field of Classification Search
CPC ............. H04L 27/2634; H04L 27/2637; H04L 27/265
See application file for complete search history.

(56) References Cited

U.S. PATENT DOCUMENTS

| | | | |
|---|---|---|---|
| 6,763,072 B1 * | 7/2004 | Matsui | H04L 27/2627 375/260 |
| 7,995,674 B2 | 8/2011 | Hori et al. | |
| 2004/0202138 A1 * | 10/2004 | Song | H03M 13/2957 370/335 |
| 2007/0254693 A1 * | 11/2007 | Furukawa | H04B 7/2621 455/553.1 |
| 2008/0260055 A1 * | 10/2008 | Kim | H04L 5/0007 375/260 |
| 2009/0092193 A1 | 4/2009 | Fujita | |
| 2011/0310932 A1 * | 12/2011 | Park | H04L 27/2636 375/141 |

FOREIGN PATENT DOCUMENTS

WO    2013010781 A1    1/2013

OTHER PUBLICATIONS

Windisch, Marcus and Fettweis, Gerhard, "On the impact of I/Q imbalance in multi-carrier systems for different channel scenarios", IEEE International Symposium on Circuits and Systems 2007 (ISCAS2007), New Orleans, LA, USA, May 27-30, 2007.
IEEE 802 meeting document, 11-15/1314r2, "I/O Imbalance Impact to TGax OFDMA Uplink Reception", Nov. 9, 2015.

(Continued)

*Primary Examiner* — Janice Tieu
(74) *Attorney, Agent, or Firm* — Borden Ladner Gervais LLP; Todd Keeler

(57) ABSTRACT

A method and apparatus for orthogonal frequency division multiplexing (OFDM) modulation includes separating a frequency-domain sequence of complex numbers into a first portion and a second portion that is disjoint with the first portion, each of the first portion and the second portion including a respective half of the complex numbers of the frequency-domain sequence, and generating a time-domain sequence having a real in-phase component that is a function of the first portion only, and an imaginary quadrature-phase component that is a function of the second portion only.

6 Claims, 15 Drawing Sheets

(56) References Cited

OTHER PUBLICATIONS

IEEE 802 meeting document, 11-15/1068r1, "Reliable Dual Sub-Carrier Modulations (DCM), for HE-SIG-B and Data", Sep. 12, 2015.
Rappaport, Theodore S., "Wireless Communications, Principles and Practice", Prentice Hall PTR, 1996, p. 324-331.
International Patent Application No. PCT/CA2017/050246, International Search Report and Written Opinion dated May 16, 2017.
Shouxing: "I-Q Decoupled OFDM Modulation", slides 1-27, Mar. 15, 2016 Accessed Apr. 20, 2017 and available from https://mentor.ieee.org/802.11/dcn/16/11-16-0318-02-00ay-i-q-decoupled-ofdm-modulation.ppt.

* cited by examiner

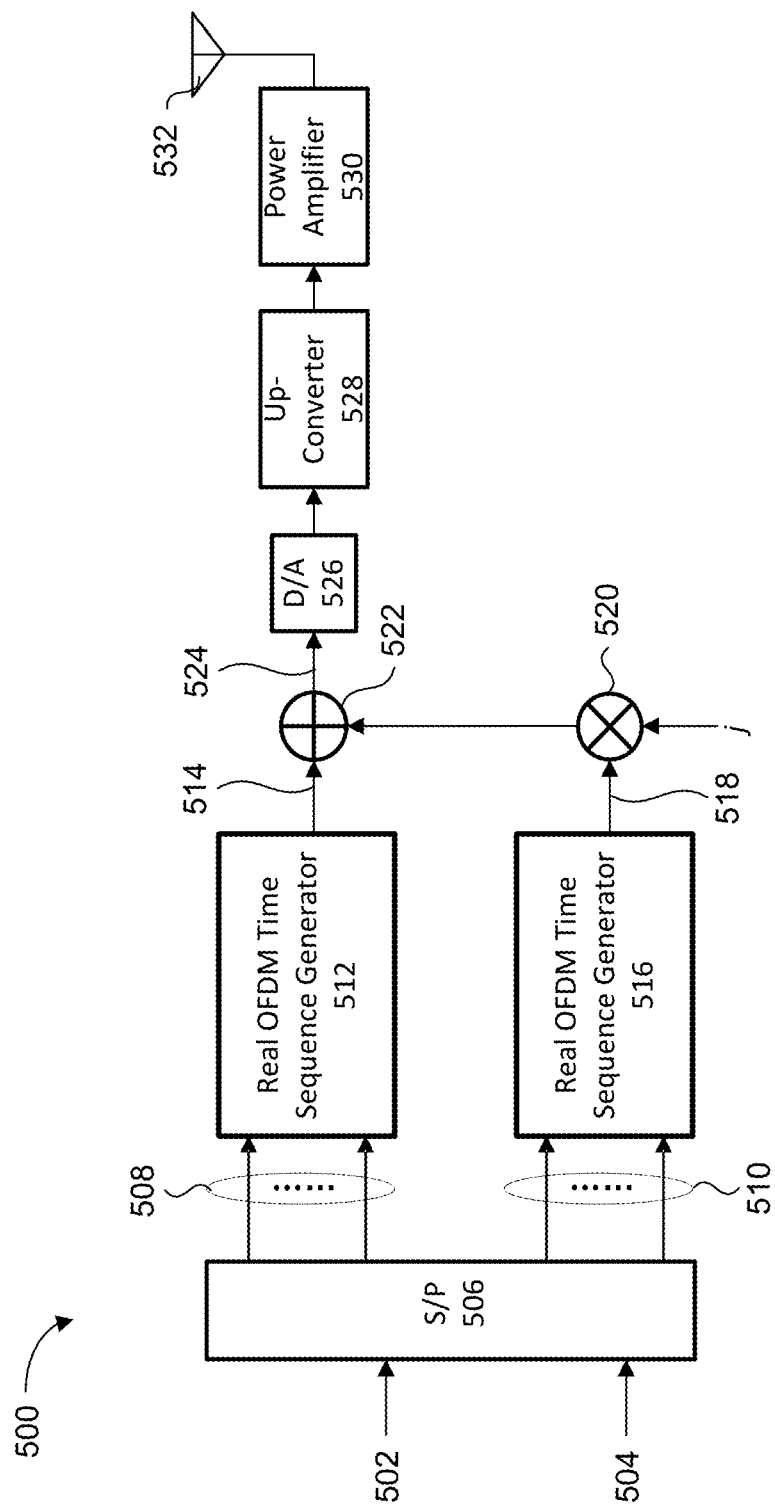

(a) I - Component  (b) Q-Component (a) I - Component  (b) Q-Component

METHOD AND APPARATUS FOR I-Q DECOUPLED OFDM MODULATION AND DEMODULATION

TECHNICAL FIELD

The present disclosure relates to orthogonal frequency division multiplexing (OFDM) modulation and demodulation.

BACKGROUND

Orthogonal frequency division multiplexing (OFDM) is a popular digital modulation scheme widely adopted by various modern communications systems such as LTE/LTE-A standard and IEEE 802.11 standard for wireless local area network (WLAN). In OFDM, the available radio frequency (RF) band is divided into multiple subcarriers (or equivalently, tones), and each subcarrier is independently modulated with a same or different digital modulation schemes such as M-ary Phase-Shift Keying (MPSK) and Quadrature Amplitude Modulation (QAM).

To generate a baseband OFDM symbol, a sequence of N complex symbols, $S=\{S_k\}$, $k=0, 1, \ldots, N-1$, which is a sequence of complex numbers that represent a data sequence in the frequency-domain, is to be processed as input. An inverse discrete Fourier transform (IDFT) operation is performed on the complex frequency sequence to generate a time-domain sequence of N complex symbols, $s=\{s_n\}$, $n=0, 1, \ldots, N-1$.

Each time-domain number of $s_n$ is a complex number and can be expressed as $s_n=a_n+jb_n$, where $a_n$ and $b_n$, both being real numbers, are the in-phase (I) and quadrature-phase (Q) components of $s_n$ respectively.

After a series of processes performed by the transmitter and the receiver and propagation, the ratio between in-phase and quadrature-phase components of $s_n$ may change in the complex time sequence received for demodulation, which is generally referred to as I-Q imbalance. I-Q imbalance is mainly introduced by the up-converter and the RF power amplifier in transmitter, as well as the down-converter in the receiver, due to unbalanced gains between the in-phase and quadrature-phase branches.

Previous efforts to address I-Q imbalance generally focus on improving the accuracy during manufacturing of the related RF devices, such as RF power amplifiers, up-converters, and down-converters. Highly accurate RF devices are more expensive, and the resulting improvement I-Q imbalance that is achieved by the increased accuracy is limited.

Improvements OFDM systems to increase robustness to I-Q imbalance are desired.

SUMMARY

According to one aspect of the present disclosure, a method is provided for orthogonal frequency division multiplexing (OFDM) modulation that includes separating a frequency-domain sequence of complex numbers into a first portion and a second portion that is disjoint with the first portion, each of the first portion and the second portion including a respective half of the complex numbers of the frequency-domain sequence, and generating a time-domain sequence having a real in-phase component that is a function of the first portion only, and an imaginary quadrature-phase component that is a function of the second portion only.

In another aspect generating the time-domain sequence comprises pre-encoding the frequency-domain sequence to generate a pre-encoded frequency-domain sequence and performing an inverse discrete Fourier transform (IDFT) operation on the pre-encoded frequency-domain sequence to generate the time-domain sequence.

In another aspect, when the IDFT operation is performed with a frequency offset equal to half of the subcarrier space, pre-encoding the frequency-domain sequence includes expanding the first portion by generating a first conjugate symmetric sequence based on the first portion, expanding the second portion by generating a second conjugate symmetric sequence based on the second portion, and combining the first conjugate symmetric sequence as a real component of the pre-encoded frequency-domain sequence and the second conjugate symmetric sequence as an imaginary component of the pre-encoded frequency-domain sequence.

In another aspect, when the IDFT operation is performed without frequency offset, pre-encoding the frequency-domain sequence includes expanding the first portion by removing a first imaginary part of the $0^{th}$ element of the first portion, including the first imaginary part as a new element after a last element of the first portion, and generating a first conjugate symmetric sequence based on the elements of the first portion other than the $0^{th}$ element and the new element of the first portion, expanding the second portion by removing a second imaginary part of the $0^{th}$ element of the second portion, including the second imaginary part as a new element after the elements of the second portion, and generating a second conjugate symmetric sequence based on the elements of the second portion other than the $0^{th}$ element and the new element of the second portion, and combining the first conjugate symmetric sequence as a real component of the pre-encoded frequency-domain sequence and the second conjugate symmetric sequence as an imaginary component of the pre-encoded frequency-domain sequence.

In another aspect, generating the time-domain sequence includes generating a first time sequence of real numbers based on the first portion, generating a second time sequence of real numbers based on the second portion, and combining the first time sequence as the in-phase component of the time-domain sequence and the second time sequence as the quadrature-phase component of the time-domain.

In another aspect, generating one of the first time sequence and the second time sequence includes expanding the one of the first portion and the second portion by generating an conjugate symmetric sequence of the one of the first portion and the second portion, performing an IDFT operation on the conjugate symmetric sequence, and wherein the IDFT operation is performed with a frequency offset equal to half of a spacing between subcarriers.

In another aspect, generating one of the first time sequence and the second time sequence includes expanding the one of the first portion and the second portion by including a number of consecutive zero elements as last elements of the one of the first portion and the second time sequence to generate an expanded sequence, the number of consecutive zero elements being equal to the number of elements of the one of the first portion and the second portion prior to expanding, performing an IDFT operation on the expanded sequence to generate a transformed expanded sequence and removing an imaginary part from the transformed expanded sequence, and wherein the IDFT operation is performed with a frequency offset equal to half of a spacing between subcarriers.

In another aspect generating one of the first time sequence and the second time sequence includes expanding the one of the first portion and the second portion by removing a first imaginary part of the $0^{th}$ element of the one of the first portion and the second portion, including the first imaginary part as a new element after a last element of the one of the first portion and second portion, and generating a first conjugate symmetric sequence based on elements of the one of the first portion and the second portion other than the $0^{th}$ element and the new element, performing an IDFT operation on the conjugate symmetric sequence, and wherein the IDFT operation is performed without frequency offset.

In another aspect, generating one of the first time sequence and the second time sequence includes expanding the one of the first portion and the second portion to generate an expanded sequence by removing a first imaginary part of the $0^{th}$ element of the one of the first portion and the second portion, including the first imaginary part as a new element after a last element of the one of the first portion and second portion, and including a number of consecutive zero elements as last elements of the one of the first portion and the second time sequence to generate an expanded sequence, the number of consecutive zero elements being equal to one less than the number of elements of the one of the first portion and the second portion prior to expanding, performing an IDFT operation on the expanded sequence to generate a transformed expanded sequence, wherein the IDFT operation is performed without frequency offset, removing an imaginary component from the transformed expanded sequence.

In another aspect the frequency-domain sequence associated with a plurality of users, the method further includes assigning the complex numbers of the frequency-domain sequence to subcarriers such that both subcarriers of a pair of symmetric subcarriers are assigned to a same user of the plurality of users, and for each pair of symmetric subcarriers allocated to one of the plurality of users, modulating one subcarrier of the pair of symmetric subcarriers utilizing a first complex number of the frequency-domain sequence and modulating the other subcarrier of the pair of symmetric subcarriers utilizing a conjugate of the first complex symbol.

In another aspect assigning the complex numbers includes utilizing a first set of complex numbers associated with a first group of users of the plurality of users to generate a real component of the time-domain sequence, and utilizing a second set of complex numbers associated with a second group of users of the plurality of users, the second group comprising users not in the first group, to generate an imaginary component of the time-domain sequence.

In another aspect assigning the complex numbers includes assigning the complex numbers of the plurality of users to the subcarriers according to a first allocation plan for generating the in-phase component of the time-domain sequence, and assigning the complex numbers of the plurality of users to the subcarriers according to a second allocation plan that is different from the first allocation plan for generating the quadrature-phase component of the time-domain sequence.

According to another aspect of the present disclosure, an orthogonal frequency division multiplexing (OFDM) transmitter includes a processor configured to separate a frequency-domain sequence of complex numbers into a first portion and a second portion that are non-overlapping, and generate a time-domain sequence having a real in-phase component that is a function of the first portion only, and an imaginary quadrature-phase component that is a function of the second portion only.

In another aspect, the OFDM transmitter includes a pre-encoder configured to generate the time-domain sequence by pre-encoding the frequency-domain sequence to generate a pre-encoded frequency-domain sequence and perform an inverse discrete Fourier transform (IDFT) operation on the pre-encoded frequency-domain sequence to generate the time-domain sequence.

In another aspect, the pre-encoder performs the IDFT operation with a frequency offset equal to half of the subcarrier space, the pre-encoder is configured to expand the first portion by generating a first conjugate symmetric sequence based on the first portion, expand the second portion by generating a second conjugate symmetric sequence based on the second portion, and combine the first conjugate symmetric sequence as a real component of the pre-encoded frequency-domain sequence and the second conjugate symmetric sequence as an imaginary component of the pre-encoded frequency-domain sequence.

In another aspect, the pre-encoder performs the IDFT operation without frequency offset, and the pre-encoder is configured to expand the first portion by removing a first imaginary part of the $0^{th}$ element of the first portion, including the first imaginary part as a new element after a last element of the first portion, and generating a first conjugate symmetric sequence based on the elements of the first portion other than the $0^{th}$ element and the new element of the first portion, expand the second portion by removing a second imaginary part of the $0^{th}$ element of the second portion, including the second imaginary part as a new element after the elements of the second portion, and generating a second conjugate symmetric sequence based on the elements of the second portion other than the $0^{th}$ element and the new element of the second portion, and combine the first conjugate symmetric sequence as a real component of the pre-encoded frequency-domain sequence and the second conjugate symmetric sequence as an imaginary component of the pre-encoded frequency-domain sequence.

In another aspect, to generate the time-domain sequence, the processor is configured to generate a first time sequence of real numbers based on the first portion, generate a second time sequence of real numbers based on the second portion, and combine the first time sequence as the in-phase component of the time-domain sequence and the second time sequence as the quadrature-phase component of the time-domain.

In another aspect, to generate one of the first time sequence and the second time sequence, the processor is configured to expand the one of the first portion and the second portion by generating an conjugate symmetric sequence of the one of the first portion and the second portion, perform an IDFT operation on the conjugate symmetric sequence, and wherein the IDFT operation is performed with a frequency offset equal to half of a spacing between subcarriers.

In another aspect, wherein, to generate one of the first time sequence and the second time sequence, the processor is configured to expand the one of the first portion and the second portion by removing a first imaginary part of the $0^{th}$ element of the one of the first portion and the second portion, include the first imaginary part as a new element after a last element of the one of the first portion and second portion, and generate a first conjugate symmetric sequence based on elements of the one of the first portion and the second portion other than the $0^{th}$ element and the new element, perform an IDFT operation on the conjugate symmetric sequence, and wherein the IDFT operation is performed without frequency offset.

In another aspect, to generate one of the first time sequence and the second time sequence, the processor is configured to expand the one of the first portion and the second portion by including a number of consecutive zero elements as last elements of the one of the first portion and the second time sequence to generate an expanded sequence, the number of consecutive zero elements being equal to the number of elements of the one of the first portion and the second portion prior to expanding, perform an IDFT operation on the expanded sequence to generate a transformed expanded sequence and removing an imaginary part from the transformed expanded sequence, and wherein the IDFT operation is performed with a frequency offset equal to half of a spacing between subcarriers.

In another aspect to generate one of the first time sequence and the second time sequence, the processor is configured to expand the one of the first portion and the second portion to generate an expanded sequence by removing a first imaginary part of the $0^{th}$ element of the one of the first portion and the second portion, including the first imaginary part as a new element after a last element of the one of the first portion and second portion and including a number of consecutive zero elements as last elements of the one of the first portion and the second time sequence to generate an expanded sequence, the number of consecutive zero elements being equal to one less than the number of elements of the one of the first portion and the second portion prior to expanding, perform an IDFT operation on the expanded sequence to generate a transformed expanded sequence, wherein the IDFT operation is performed without frequency offset, and removing an imaginary component from the transformed expanded sequence.

In another aspect, the frequency-domain sequence associated with a plurality of users, and the processor is further configured to assign the complex numbers of the frequency-domain sequence to subcarriers such that both subcarriers of a pair of symmetric subcarriers are assigned to a same user of the plurality of users, and for each pair of symmetric subcarriers allocated to one of the plurality of users, modulate one subcarrier of the pair of symmetric subcarriers utilizing a first complex number of the frequency-domain sequence and modulate the other subcarrier of the pair of symmetric subcarriers utilizing a conjugate of the first complex symbol.

In another aspect, assigning the complex numbers includes utilizing a first set of complex numbers associated with a first group of users of the plurality of users to generate a real component of the time-domain sequence, and utilizing a second set of complex numbers associated with a second group of users of the plurality of users, the second group comprising users not in the first group, to generate an imaginary component of the time-domain sequence.

In another aspect, assigning the complex numbers comprises assigning the complex numbers of the plurality of users to the subcarriers according to a first allocation plan for generating the in-phase component of the time-domain sequence, and assigning the complex numbers of the plurality of users to the subcarriers according to a second allocation plan that is different from the first allocation plan for generating the quadrature-phase component of the time-domain sequence.

According to another aspect of the present disclosure, a method is provided for orthogonal frequency division multiplexing (OFDM) demodulation including performing a discrete Fourier transform (DFT) operation on a time-domain sequence to generate a received frequency-domain sequence, separating the received frequency-domain sequence into a first frequency sequence and a second frequency sequence, performing a symbol decision operation the first frequency sequence to generate a first set of decided symbols, performing a symbol decision operation on the second frequency sequence to generate a second set of decided symbols, and sequentially outputting the decided symbols of the first set and the second set such that the output decided symbols form a frequency-domain sequence.

According to another aspect of the present disclosure, a method is provided for orthogonal frequency division multiplexing (OFDM) demodulation includes separating a time-domain sequence into a real part to obtain an in-phase component and an imaginary part to obtain a quadrature-phase component, separately, for each of the in-phase component and the quadrature-phase component performing a discrete Fourier transform (DFT) operation, performing a combining operation on an output of the DFT operation, and performing a symbol decision operation on an output of the DFT operation to generate decided symbols, and sequentially outputting the decided symbols such that the output decided symbols form a frequency-domain sequence.

In another aspect, prior to separating the time-domain sequence, performing a discrete Fourier transform (DFT) operation on the time-domain sequence to generate a complex sequence in the frequency-domain, performing frequency equalization of the complex sequence in the frequency-domain to generate an equalized complex sequence, and performing an inverse discrete Fourier transform (IDFT) operation on the equalized complex sequence to generate an equalized time-domain sequence, and wherein separating the time-domain sequence comprises separating the equalized time-domain sequence.

According to another aspect of the present disclosure, an orthogonal frequency division multiplexing (OFDM) receiver includes an antenna for receiving a time-domain sequence, a processor coupled to the antenna and configured to perform a discrete Fourier transform (DFT) on the time-domain sequence to generate a received frequency-domain sequence, separate the received frequency-domain sequence into a first frequency sequence and a second frequency sequence, perform a symbol decision operation the first frequency sequence to generate a first set of decided symbols, perform a symbol decision operation on the second frequency sequence to generate a second set of decided symbols, and sequentially output the decided symbols of the first set and the second set such that the output decided symbols form a frequency-domain sequence.

According to another aspect of the present disclosure, an orthogonal frequency division multiplexing (OFDM) receiver includes an antenna for receiving a time-domain sequence, a processor coupled to the antenna and configured to separate a time-domain sequence into a real part to obtain an in-phase component and an imaginary part to obtain a quadrature-phase component, separately, for each of the in-phase component and the quadrature-phase component perform a discrete Fourier transform (DFT) operation, perform a combining operation on an output of the DFT operation, and perform a symbol decision operation on an output of the DFT operation to generate decided symbols, and sequentially output the decided symbols such that the output decided symbols form a frequency-domain sequence.

In another aspect, the processor is configured to, prior to separating the time-domain sequence, perform a discrete Fourier transform (DFT) operation on the time-domain sequence to generate a complex sequence in the frequency-domain, perform frequency equalization of the complex sequence in the frequency-domain to generate an equalized complex sequence, and perform an inverse discrete Fourier transform (IDFT) operation on the equalized complex sequence to generate an equalized time-domain sequence, and wherein separating the time-domain sequence comprises separating the equalized time-domain sequence.

DRAWINGS

The following figures set forth embodiments in which like reference numerals denote like parts. Embodiments are illustrated by way of example and not by way of limitation in the accompanying figures.

FIG. 5 is a schematic diagram of a transmitter for performing the method of DC-OFDM modulation shown in FIG. 4 according to an embodiment;

Figure 15:
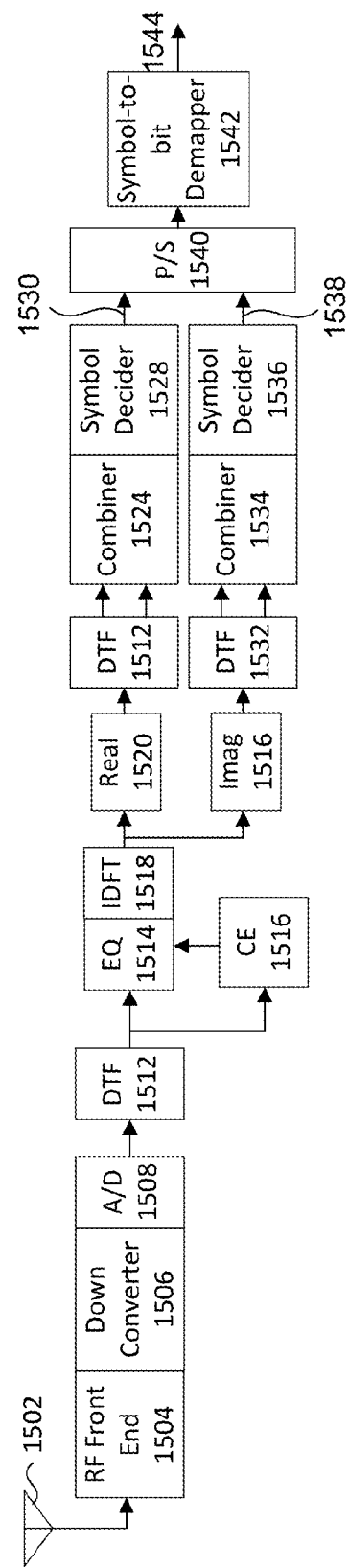
Figure 14:
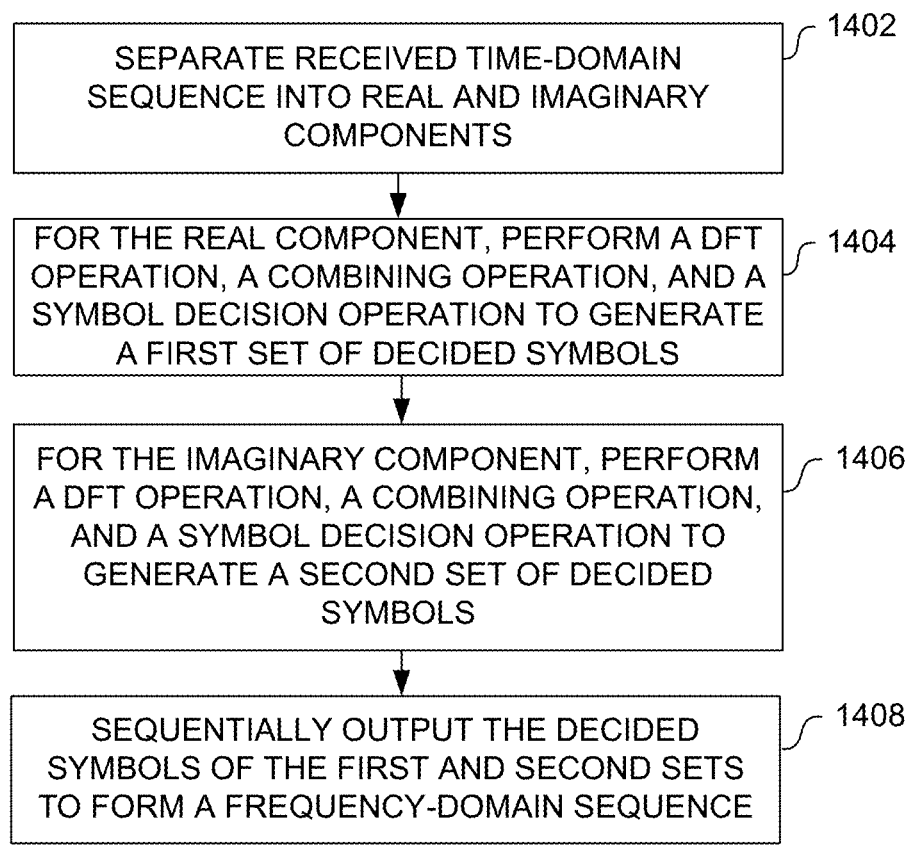
Figure 16:
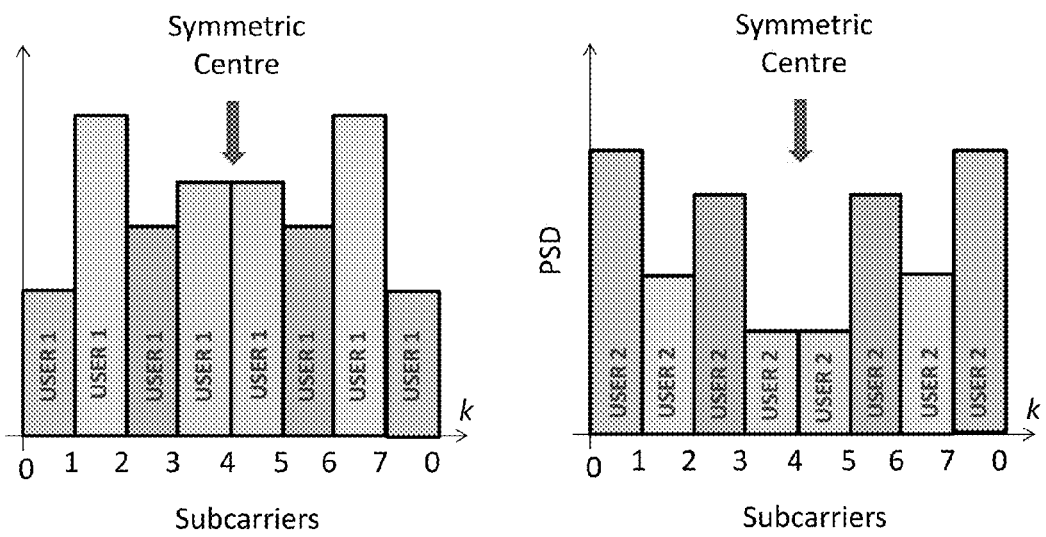
Figure 17:
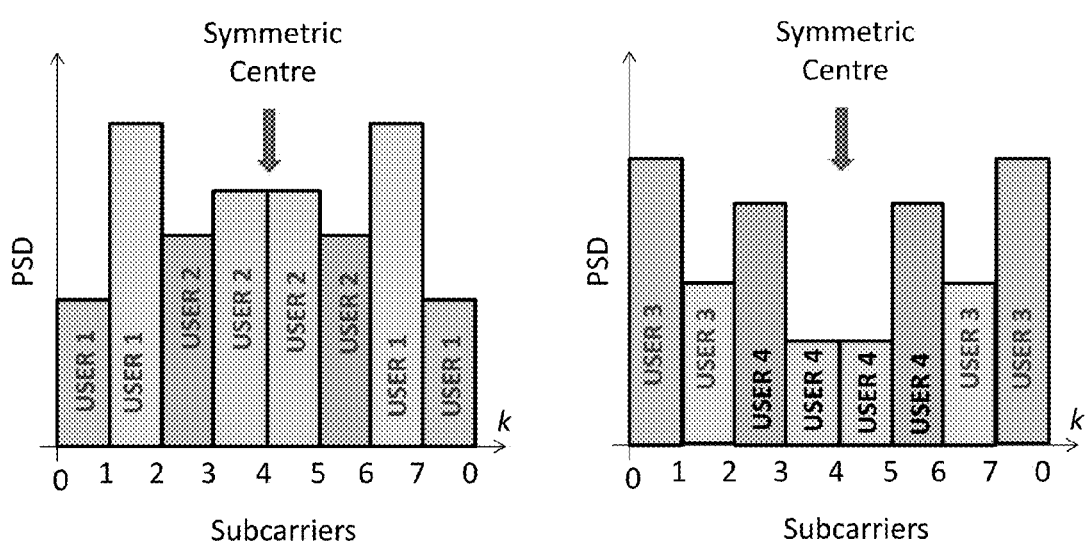
Figure 18:
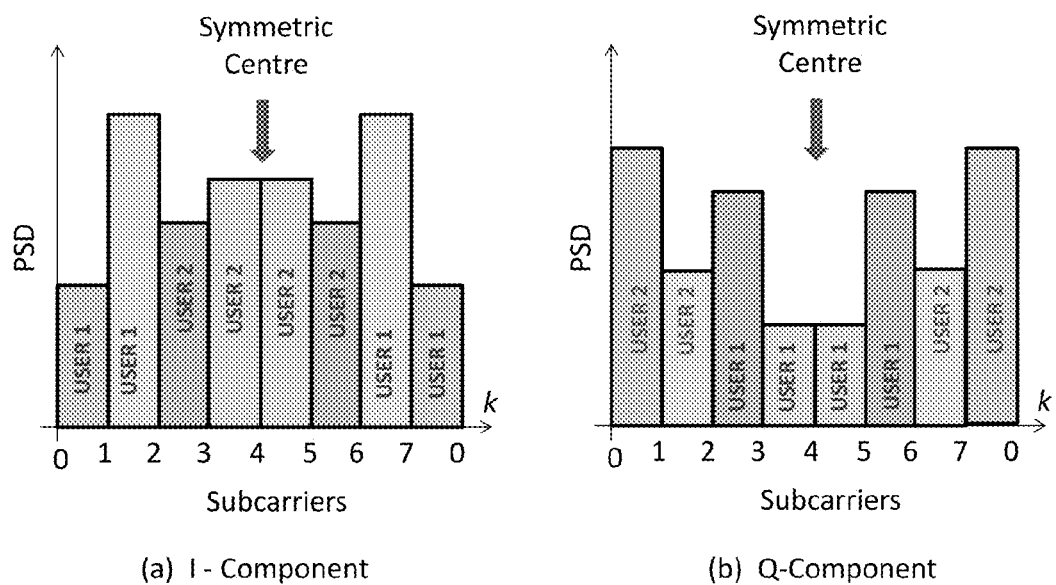
Figure 19:
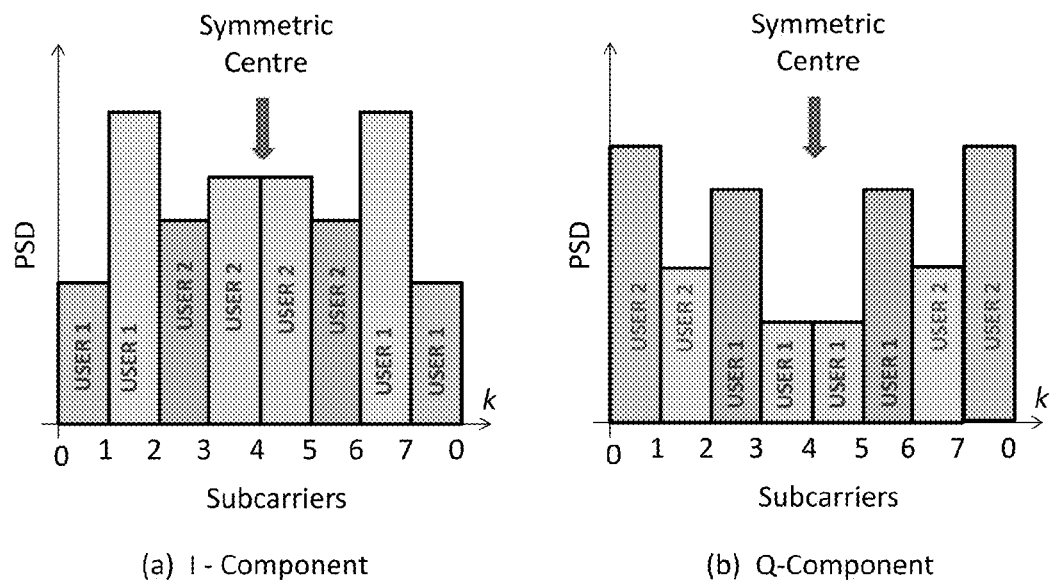
Figure 20:
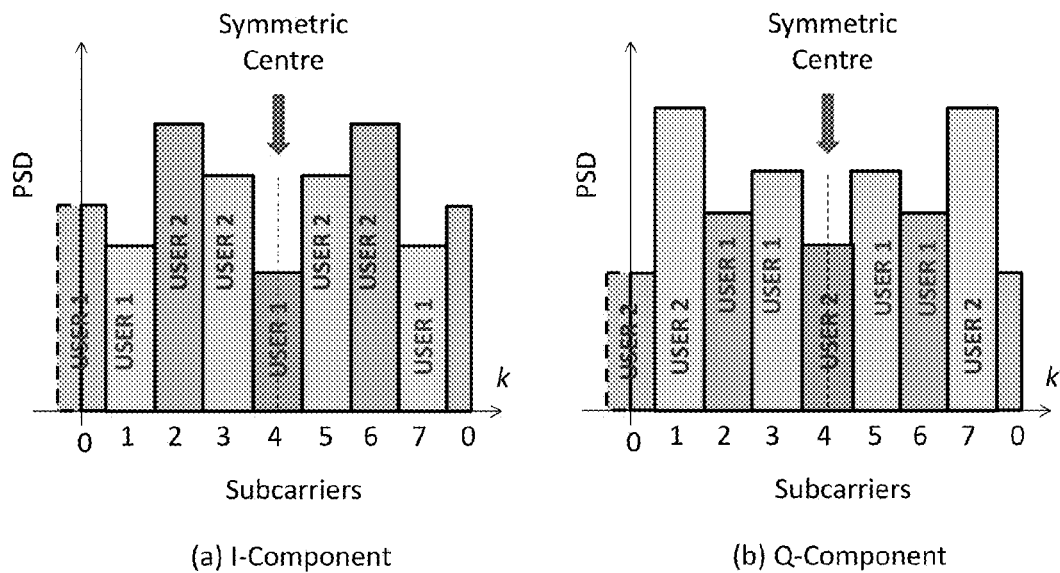
Figure 21:
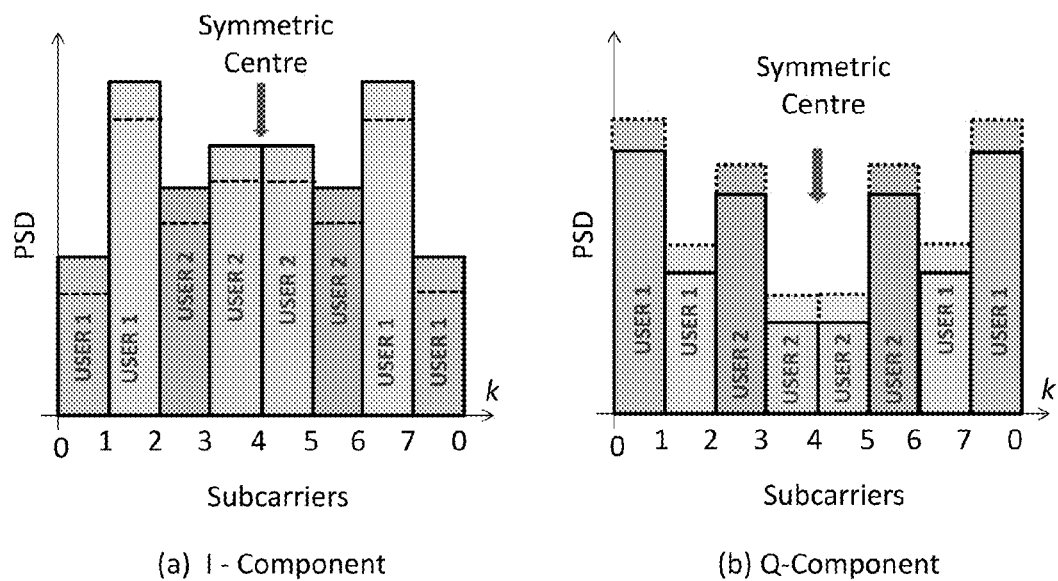
Figure 22:
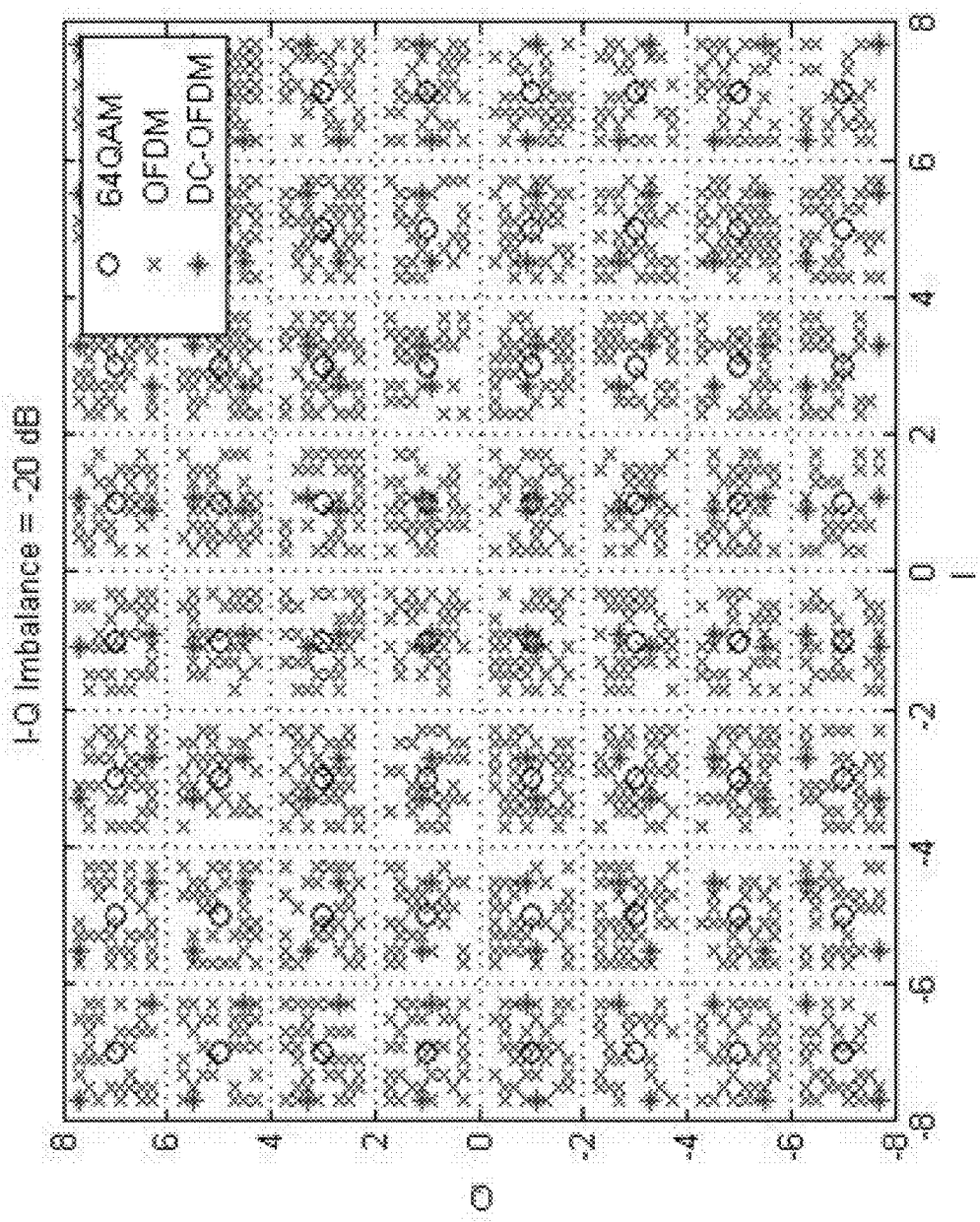

FIG. 14 a flow chart illustrating a method for performing DC-OFDM demodulation according to another embodiment;

FIG. 15 is a schematic diagram of a receiver for performing the method of DC-OFDM demodulation shown in FIG. 14 according to an embodiment;

FIG. 16 is an example power spectrum in multi-user DC-OFDM modulation according to an embodiment;

FIG. 17 is an example power spectrum in multi-user DC-OFDM modulation according to another embodiment;

FIG. 18 is an example power spectrum in multi-user DC-OFDM modulation according to another embodiment;

FIG. 19 is an example power spectrum in multi-user DC-OFDM modulation according to another embodiment;

FIG. 20 is an example power spectrum in multi-user DC-OFDM modulation according to another embodiment;

FIG. 21 is an example power spectrum in multi-user DC-OFDM modulation illustrating the I-Q imbalance; and FIG. 22 is an example chart of recovered frequency-domain sequences in an OFDM receiver and a DC-OFDM receiver.

DETAILED DESCRIPTION

The following describes a method and apparatus for orthogonal frequency division multiplexing (OFDM) modulation and demodulation, referred to herein as I-Q decoupled OFDM (DC-OFDM). Compared to the traditional OFDM modulation scheme, DC-OFDM is more robust to the I-Q imbalance impairment. In addition, DC-OFDM provides improved reliability in frequency-selective fading channels without reducing throughput.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1:
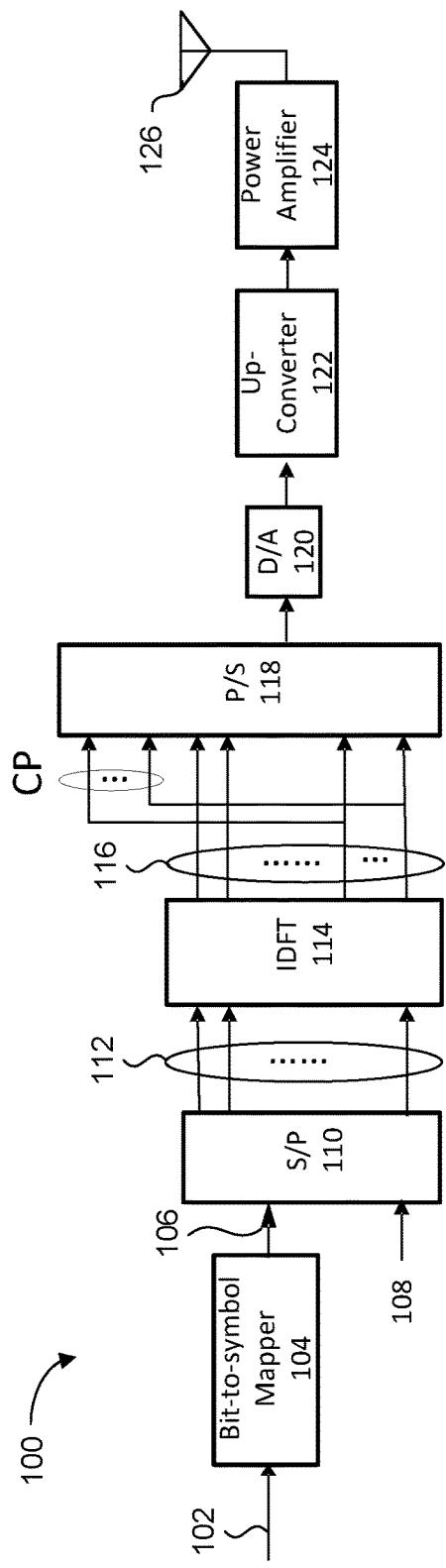
FIG. 1 is a schematic diagram of a transmitter utilized for performing traditional OFDM modulation.

Referring now to FIG. 1, a schematic diagram of a transmitter 100 utilized for traditional OFDM modulation of a bit stream 102 of data to be transmitted is shown. A bit-to-symbol operation is performed on the bit stream 102 by a bit-to-symbol mapper 104, which outputs data symbols 106. The output data symbols 106 are input, together with optional pilot symbols 108, to serial-to-parallel switch 110 to form a frequency-domain sequence 112, $S=\{S_k\}$, $k=0, 1, \ldots, N-1$ having complex number elements.

In practice, a small number of the subcarriers, or tones, may be reserved in order to transmit the optional pilot symbols 108. The pilot symbols 108 are predetermined and known by the receiver, and are used by a receiver to estimate channel characteristics. Herein, the terms "subcarrier" and "tones" are equivalent and used interchangeably.

For OFDM modulation having N subcarriers the frequency-domain sequence 112 is a sequence of N complex symbols, which are complex numbers that represent a sequence of the bit stream data 102. The sequence of bit stream data 102 may be associated with a single user, which is referred to as single-user OFDM. Alternatively, the sequence of bit stream data 102 may be associated with more than one user, which is referred to as multi-user OFDM (MU OFDM).

To generate a baseband OFDM symbol, the frequency-domain sequence is transformed to a time-domain sequence 116, $s=\{s_n\}$, $n=0, 1, \ldots, N-1$, of complex symbols, through the inverse discrete Fourier transform (IDFT). The IDFT operation may be given by the following equation:

$$s_n \equiv IDFT\{S_k\} = \frac{1}{N}\sum_{k=0}^{N-1} S_k \exp\left(j\frac{2\pi kn}{N}\right), \quad (1)$$

$$n = 0, 1, \ldots, N-1.$$

In the transmitter shown in FIG. 1, the IDFT operation is represented by IDFT 114 which outputs the time-domain sequence 116.

In equation (1), $S_k$ specifies the signal magnitude and the phase of the $k^{th}$ subcarrier at a frequency $f_k=k/NT$ Hz, where T stands for the symbol interval excluding a cyclic prefix (CP). The time-domain sequence $\{s_n\}$, after padding with a CP sequence, is input to a parallel-to-serial switch 118, converted to an analog signal by a digital-to-analogue converter 120, up-converted to a RF band having a carrier frequency $f_c$ by an up-converter 122, and amplified by power amplifier 124 before being transmitted via an antenna 126.

Figure 2:
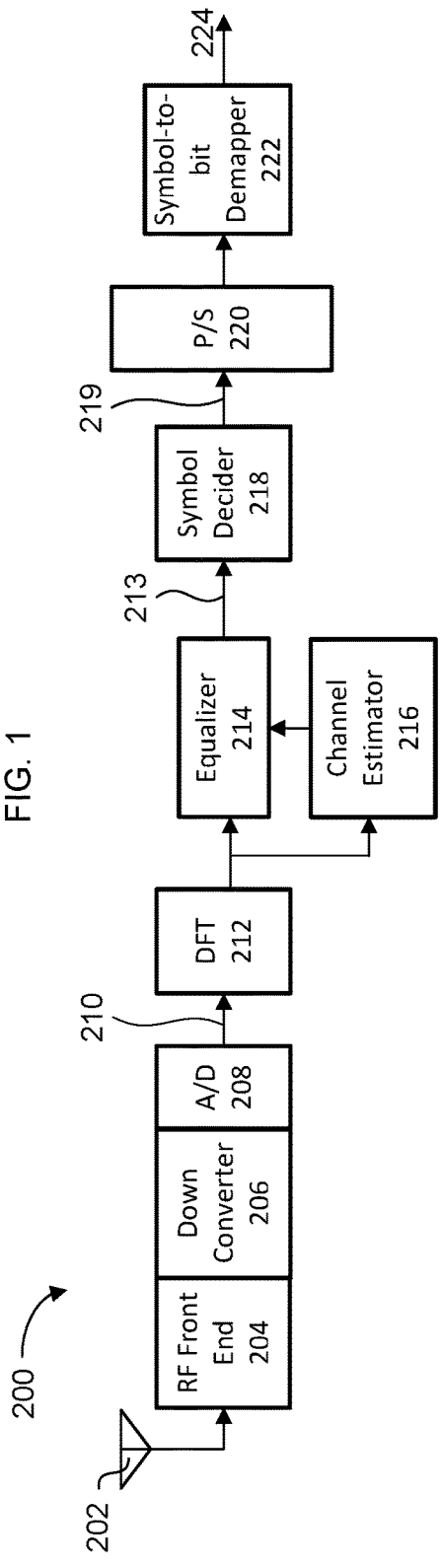
FIG. 2 is a schematic diagram of a receiver utilized for performing traditional OFDM demodulation.

Referring now to FIG. 2, a schematic diagram of a receiver 200 utilized for traditional OFDM demodulation is shown. The OFDM modulated signal may be generated and transmitted by, for example, the transmitter 100 shown in FIG. 1. The receiver 200 receives a signal via an antenna 202 and generally performs the reverse operations of the operations performed by the transmitter 100 in order to recover the original bit stream data. For example, the receiver 200 may include an RF front end 204 perform a down-conversion operation of the received signal from an RF band to a baseband. The receiver 200 may include a down converter 206 and an analogue-to-digital converter 208 to convert the received signal to a discrete time-domain sequence 210, $\{s_n\}$. Corresponding to equation (1), the frequency-domain sequence 213 of $\{S_k\}$ then is recovered from the time-domain sequence 210 $\{s_n\}$ by a discrete Fourier transform (DFT) operation represented by DST 212. The DFT operation may be given by the following equation:

$$s_k \equiv DFT\{s_n\} = \sum_{k=0}^{N-1} s_n \exp\left(-j\frac{2\pi kn}{N}\right), \quad (2)$$

$$k = 0, 1, \ldots, N-1.$$

In practice, the received signal generally includes distortion due to the non-ideal characteristics of the channel. The distortion may be (at least partially) removed in the receiver 200 by an equalizer 214 that performs an equalization (EQ) operation on the frequency-domain sequence 213, if the channel state information (CSI) is available to the equalizer 214. To perform the EQ operation, the received pilot symbols optionally added by the transmitter, such as for example pilot symbols 108 optionally added by the transmitter 100 shown in FIG. 1, are used by a channel estimator 216 to perform a channel estimation (CE) operation. The CE provides the equalizer 214 with an estimated CSI. The estimated CSI may be then utilized by the equalizer 214 to reduce, or in some cases remove, the distortion.

After distortion is optionally reduced or removed by the equalizer 214, a symbol decision operation is performed by a symbol decider 218. In the symbol decision operation, the symbol carried by each subcarrier is detected, or decided, by comparing the symbol value with a signal constellation used by the subcarrier in the transmitter. The symbol decider 218 makes a decision on which symbol of the constellation was most likely transmitted. The decided symbols 219 output by the symbol decider 219 may then be sequentially output by a parallel-to-serial switch 220 and sequentially demapped by symbol-to-bit demapper 222 to generate a bit stream 224.

Equations (1) and (2) form a DFT-IDFT pair between $\{S_k\}$ and $\{s_n\}$. Alternatively, a DFT-IDFT pair may be defined with a frequency shift of half the subcarrier space, i.e., 1/2NT Hz. Including this frequency shift, equations (1) and (2) become:

$$s_n \equiv IDFT\{S_k\} = \frac{1}{N}\sum_{k=0}^{N-1} S_k \exp\left(j\frac{2\pi(k+0.5)n}{N}\right), \quad (3)$$

$$n = 0, 1, \ldots, N-1,$$

and $$S_k \equiv DFT\{s_n\} = \sum_{k=0}^{N-1} s_n \exp\left(-j\frac{2\pi(k+0.5)n}{N}\right), \quad (4)$$

$$k = 0, 1, \ldots, N-1.$$

For convenience, the following unified equations are used hereafter for the DFT-IDFT pair for both cases of (1)-(2) and (3)-(4), $$s_n = \frac{1}{N}\sum_{k=0}^{N-1} S_k \exp\left(j\frac{2\pi(k+\delta)n}{N}\right), n = 0, 1, \ldots, N-1, \quad (5)$$

and $$S_k = \sum_{k=0}^{N-1} s_n \exp\left(-j\frac{2\pi(k+\delta)n}{N}\right), k = 0, 1, \ldots, N-1, \quad (6)$$

where $\delta$ can be 0, leading to equations (5) and (6) being equivalent to equations (1) and (2), or 0.5, leading to equations (5) and (6) being equivalent to equations (3) and (4). The DFT-IDFT pair with either value of $\delta$ can be used in OFDM.

In either case, each time-domain number of $s_n$ is a complex number and can be expressed as:

$$s_n = a_n + jb_n, \quad (7)$$

where $a_n$ and $b_n$, are real numbers, and $a_n$ is the in-phase and $b_n$ is the quadrature-phase components of the time-domain sequence $s_n$ respectively.

In traditional OFDM, the in-phase and quadrature-phase components of the time-domain signal are determined by the same frequency-domain data sequence $\{S_k\}$, as shown in equation (5), and are closely related to each other.

As stated above, in MU OFDM, OFDM modulation is utilized with multiple users such that the subcarriers are allocated to different users such that data associated with different users are simultaneously transmitted. MU OFDM may be used for both up-link (UL) and down-link (DL) transmissions in various communications standards.

A slightly modified OFDM scheme, called dual subcarrier OFDM modulation (DSC-OFDM), was adopted by IEEE 802.11ad specifications and by IEEE 802.11ax Task Group (TGax) as an optional modulation scheme. Whereas in regular OFDM, each tone is modulated by an independent data, in DSC-OFDM, two tones are modulated by a data and its conjugate respectively. In other words, the information of each data is carried and transmitted by two tones in DSC-OFDM. This improves the transmission reliability especially in frequency-selective fading channels, at a cost that the redundancy introduced in DSC-OFDM reduces the data rate by half as a trade-off between the reliability and the spectrum efficiency.

A problem with traditional OFDM modulation is that, after a series of processes and propagation, when the signal is received by the receiver and is down-converted to the baseband time sequence, inevitably the ratio between the I-component and the Q-components of $s_n$ has been changed, resulting in a phenomenon referred to as "I-Q imbalance".

In practice, I-Q imbalance (I-QI) may be introduced by, for example, the up-converter 122 and the RF power amplifier 124 in transmitter 100, as well as the down-converter 206 in the receiver 200, due to unbalanced gains between the in-phase branch and the quadrature-phase branch.

The time sequence recovered in the receiver may be expressed as $$\tilde{s}_n = \tilde{a}_n + j\tilde{b}_n, \quad (8)$$

where $\tilde{a}_n$ and $\tilde{b}_n$ are real numbers, and can be expressed in a form of:

$$\tilde{a}_n = (\alpha+\beta)a_n \quad (9)$$

and $$\tilde{b}_n = (\alpha-\beta)b_n. \quad (10)$$

where $\alpha$ and $\beta$ are real numbers.

Substituting (9)-(10) into (8) yields $$\tilde{s}_n = \alpha(a_n+jb_n) + \beta(a_n-jb_n) = \alpha s_n + \beta s_n^*, \quad (11)$$

where x* indicates a complex conjugate of x. Under ideal conditions in which no I-Q imbalance occurs, $\beta=0$. Otherwise I-Q imbalance occurs when $|\beta|>0$. To illustrate the impact of the I-Q imbalance on OFDM, applying a DFT operation to equation (11) yields:

$$\tilde{S}_k = \alpha S_k + \beta \hat{S}_k, \quad (12)$$

where $\{\hat{S}_k\} \equiv DFT\{s_n^*\}$. On the right-hand side of equation (12), the first term is the desired data sequence, i.e. $S_k$, while the second term is an interference term. It can be shown that:

$$\hat{S}_k \equiv DFT\{s_n^*\} = S_{N-k-2\delta}^* = \begin{cases} S_{N-k}^* & \text{for } \delta = 0 \\ S_{N-k-1}^* & \text{for } \delta = 0.5 \end{cases}. \quad (13)$$

The subscript of $N-k-2\delta$ of $S_{N-k-2\delta}^*$ follows the rule of modulo N operation. For example, with $\delta=0$ and $k=0$, $N-k-2\delta=N$ modulo $N=0$, because the frequency axis is cyclically repeated in digital signal processing.

Therefore, $\{S_{N-k-2\delta}^*\}$ is the conjugate sequence of $\{S_k\}$ with reversed order. In other words, $\{S_{N-k-2\delta}^*\}$ is an image of the frequency-domain sequence $\{S_k\}$ that carries the data information, and therefore is often referred to as "image leakage". Image leakage may be quantified in terms of the parameter called "image leakage ratio" (ILR), where:

$$ILR = 20 \log_{10}|\beta/\alpha| \text{ (dB)}. \quad (14)$$

In an example in which $\tilde{s}_n = 1.1a_n + j0.9b_n$, $\tilde{s}_n$ can be written as $\tilde{s}_n = (1.0+0.1)a_n + j(1.0-0.1)b_n = 1.0 s_n + 0.1 s_n^*$. Thus, $\alpha=1.0$, $\beta=0.1$. From equation (14), ILR=20 $\log_{10}|0.1/1.0|=-20$ dB.

As an example with N=8, Table 1 below lists the values of $(N-k-2\delta)$ for $\delta=0$ and $\delta=0.5$. As shown in Table 1, for $\delta=0.5$, $S_0, S_1, \ldots, S_7$ are interfered by $S_7^*, S_6^*, \ldots, S_0^*$ respectively. On the other hand for $\delta=0$, $S_0$ and $S_4$ are interfered by $S_0^*$ and $S_4^*$ respectively, while $S_1, S_2, S_3, S_5, S_6$ and $S_7$ are interfered by $S_7^*, S_6^*, S_5^*, S_3^*, S_2^*$ and $S_1^*$ respectively.

TABLE 1 showing the values of N − k − 2δ (for N = 8):

| | K | | | | | | | |
|---|---|---|---|---|---|---|---|---|
| | 0 | 1 | 2 | 3 | 4 | 5 | 6 | 7 |
| δ = 0.5 | 7 | 6 | 5 | 4 | 3 | 2 | 1 | 0 |
| δ = 0 | 0 | 7 | 6 | 5 | 4 | 3 | 2 | 1 |

As indicated by equation (12), when I-Q imbalance occurs in a traditional OFDM system, the recovered frequency-domain sequence elements recovered by the receiver, for example the frequency-domain sequence 213 in receiver 200, is a linear combination of the desired data sequence and its image sequence.

Further, the in-phase and quadrature-phase components of the time-domain signal in traditional OFDM system are tightly coupled. That is, any change in either one of the in-phase component or the quadrature-phase component due to, for example, I-Q imbalance, will result in distortion in the elements of the recovered frequency-domain sequence.

The impact of the I-Q imbalance on OFDM may be illustrated by substituting (13) into (12) to show that when I-Q imbalance exists, the recovered frequency-domain sequence elements $\tilde{S}_k$ becomes:

$$\tilde{S}_k = \alpha S_k + \beta S_{N-k-2\delta}^* = \begin{cases} \alpha S_k + \beta S_{N-k}^* & \text{for } \delta = 0 \\ \alpha S_k + \beta S_{N-k-1}^* & \text{for } \delta = 0.5 \end{cases} \quad (15)$$

In traditional OFDM, $S_{N-k}^*$ (for $\delta=0$) and $S_{N-k-1}^*$ (for $\delta=0.5$) are interference terms that interfere with the reception of the frequency-domain sequence elements $S_k$ that carries the data information. The interference degrades the error rate performance of the OFDM system.

Furthermore, I-Q imbalance may affect the performance in MU OFDM systems in which different users may occupy different sub-sets of the OFDM subcarriers that are processed by a receiver. For example, in MU OFDM one user's signal may cause interference to the sub-carriers occupied by another user due to I-Q imbalance, resulting in the so-called inter-user interference.

In practice, I-Q imbalance is mainly introduced by the up-converter and the RF power amplifier in transmitter, as well as the down-converter in the receiver, due to unbalanced gains between the in-phase and quadrature-phase branches. Most of efforts to reduce the impact of I-Q imbalance are focused on improving the accuracy during manufacturing of the related RF devices. Highly accurate RF devices are more expensive, and the improvement to I-Q imbalance of such solutions is limited.

By contrast to previous attempts to reduce I-Q imbalance, disclosed herein is a method and apparatus for performing OFDM modulation in which the in-phase and quadrature-phase components of the time-domain signal are decoupled, herein referred to DC-OFDM. Decoupling of the in-phase component and the quadrature-phase results from generating each of the in-phase and quadrature-phase components of a time-domain sequence as a function of an independent portion of the frequency-domain sequence.

The reason for decoupling the in-phase and quadrature-phase components of the time-domain sequence may be utilized to reduce I-Q imbalance can be understood by considering the case in which the complex number, $S_{N-k-2\delta}$, used to modulate the $(N-k-2\delta)^{th}$ subcarrier is set to:

$$S_{N-k-2\delta} = S_k^*, \quad (16a)$$

which may be rewritten as:

$$\begin{cases} S_{N-k} = S_k^* & \text{for } \delta = 0 \\ S_{N-k-1} = S_k^* & \text{for } \delta = 0.5 \end{cases}. \quad (16b)$$

By substituting equation (16b) into equation (15) gives:

$$\tilde{S}_k = (\alpha + \beta)S_k. \quad (17)$$

Therefore, equation (17) indicates that the elements of the received frequency-domain sequence, $\tilde{S}_k$, are simply the original frequency-domain sequence element, $S_k$, with proportional scaling by a factor $(\alpha+\beta)$. This proportional scaling may be removed by descaled the received frequency-domain sequence to recover the original frequency-domain sequence.

The condition set forth in equation (16a) implies that the proportional relationship between the received frequency-domain sequence $\{\tilde{S}_k\}$ and the original frequency-domain sequence $\{S_k\}$ occurs when the original frequency-domain sequence $\{S_k\}$ has conjugate symmetry about the center of the sequence. It is noted that, with discrete signal processing such as DFT/IDFT, the frequency-domain sequence, as well as the time-domain sequence, is cyclically periodic. Thus, being symmetric around the center, or middle, of the sequence is equivalent to being symmetric around the first element, i.e., k=0.

For example, considering the case in which $\delta$=0.5, equation (16) becomes:

$$S_{N/2+i} = S_{N/2-1-i}^*, \text{ for } i=0,1,\ldots,N/2-1. \quad (18)$$

For example, with N=8, the sequence $X_1$=[1+j, −1−j, −1+j, 1+j, 1−j, −1−j, −1+j, 1−j] is of conjugate symmetry satisfying equation (18) for the case in which $\delta$=0.5.

Considering the case in which $\delta$=0, equation (16) becomes:

$$S_0 = S_0^*, \quad (19a)$$

$$S_{N/2} = S_{N/2}^*, \quad (19b)$$

and $$S_{N/2+i} = S_{S_{N/2-i}}^*, \text{ for } i=1,2,\ldots,N/2-1, \quad (19c)$$

where equations (19a) and (19b) imply that both $S_0$ and $S_{N/2}$ should be real numbers.

For example, the sequence $X_2$=[2, −1−j, 1+j, −1+j, −2, −1−j, 1−j, −1+j] is of conjugate symmetry satisfying equation (19c) for the case in which $\delta$=0.

However, in the sequence $X_1$, the last four numbers are conjugates of the first four numbers. Thus, when $X_1$ is applied to eight subcarriers, only four tones are independently modulated. Therefore, because only half of the tones can be independently modulated, based on the above the throughput would be reduced by half.

However, it is a property of Fourier transform that the IDFT of a sequence that satisfies equation (16) is a real sequence. For instance, with N=8 and $\delta$=0, the IDFT of $X_2$ of above example yields a real sequence $x_2$=IDFT$\{X_2\}$=[−0.25 0.25 0.25 0.75 0.75 0.25 −0.75 0.75].

Therefore, in order to maintain the throughput provided by traditional OFDM modulation while addressing I-Q imbalance, the symbols of the frequency-domain sequence $\{S_k\}$ may be split into two disjointed portions, each including half of the numbers, or elements, of the frequency-domain sequence. Each portion is then expanded to form an N-point sequence that are symmetric conjugates satisfying equation (16). Based on the two N-point sequences, two time sequences of real numbers may be generated and utilized as decoupled in-phase and quadrature-phase components of a time-domain signal. The time-domain signal carries the information of all N information data.

Effectively, in DC-OFDM, half of the information data included in the frequency-domain sequence is used to generate the in-phase component of the time-domain sequence while the other half of the information data included in the frequency-domain sequence is used to generate the quadrature-phase component. As a result, a change in either one or both of the in-phase or quadrature-phase components of the time-domain sequence results in a scaling, rather than distortion, of the desired signal in frequency domain.

Further, because two tones are modulated by a data and its conjugate respectively, the proposed DC-OFDM also provides frequency diversity gain similar to DSC-OFDM, but without reducing the throughput capacity of traditional OFDM.

Figure 3:
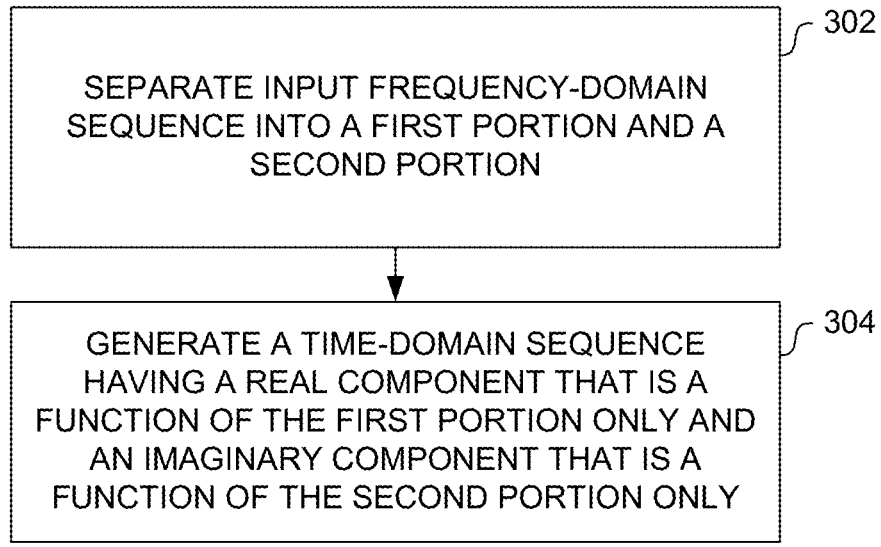
FIG. 3 is a flow chart illustrating a method for performing DC-OFDM modulation according to an embodiment.

Referring now to FIG. 3, a flow chart is shown that illustrates a method of generating a time-domain sequence $s_n$ having decoupled in-phase and quadrature phase components based on an input frequency-domain sequence $\{S_k\}$. The method may be carried out by, for example, by software executed by a processor, or by hardware, or by a combination of software and hardware.

At 302, the input frequency-domain sequence $\{S_k\}$ is split into a first portion $S_{k1}$ and a second portion $S_{k2}$ that are disjointed from one another. Each of the first portion $S_{k1}$ and the second portion $S_{k2}$ includes half of the elements of the input frequency-domain sequence $\{S_k\}$. At 304, a time-domain sequence is generated that has a real component, i.e., the in-phase component, that is a function of the first portion $S_{k1}$ only and an imaginary component, i.e., the quadrature-phase component, that is a function of the second portion $S_{k2}$ only.

Generating the time-domain sequence at 304 in the method shown in FIG. 3 may be performed in several different ways.

A first method of generating the time-domain sequence is by independently generating two time sequences of real numbers using the first portion $S_{k1}$ and the second portion $S_{k2}$, and utilizing the two time sequences as the real and imaginary components respectively to form a complex time-domain sequence. This first method is described in more detail below with reference to FIGS. 4, 5, 6A, 6B, 7A, and 7B.

A second way of generating time-domain sequence is by performing a pre-encoding operation on the frequency-domain sequence prior to performing an IDFT operation such that the resultant complex time-domain sequence has decoupled in-phase and quadrature-phase components. This second method is described in more details below with reference to FIGS. 8, 9, 10A, and 10B.

Figure 4:
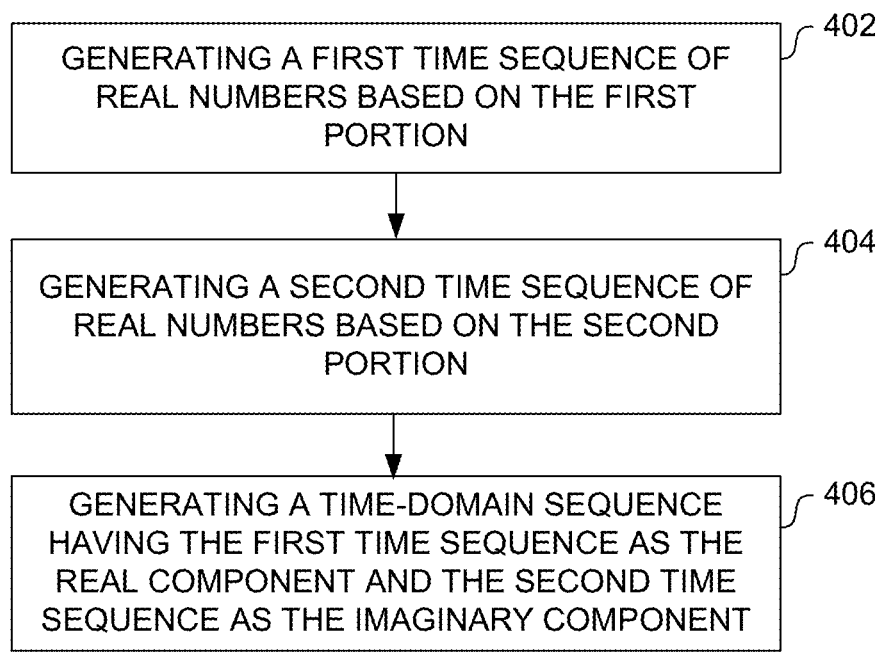
FIG. 4 is a flow chart illustrating a method for generating a time-domain sequence according to an embodiment.

FIG. 4 shows a flow chart illustrating the first method for generating the time-domain sequence. The method may be carried out by, for example, by software executed by a processor, or by hardware, or by a combination of software and hardware.

At 402, a first real time sequence of OFDM symbols is generated based on the first portion, $S_{k1}$. At 404, a second read time sequence of OFDM symbols is generated based on the second portion, $S_{k2}$. At 406, a complex time-domain sequence $s_n$ is generated using the first time sequence as the real component, i.e., the in-phase component, and the second time sequence as the imaginary component, i.e., the quadrature-phase component.

Referring now to FIG. 5, a schematic diagram of a transmitter 500 for performing DC-OFDM modulation according to the method illustrated in FIG. 4 is shown. Data symbols 502, together with optional pilot symbols 504, are input into a serial-to-parallel switch 506 similar to the data symbols 106 and pilot symbols 108 that are input into the serial-to-parallel switch 110 of the transmitter 100 shown in FIG. 1.

The frequency-domain sequence that is output by the serial-to-parallel switch 504 is split in a first portion 508 and a second portion 510. The first portion 508 and the second portion 510 are disjointed with each of the first portion 508 and the second portion 510 including half of the symbols of the frequency-domain sequence. Although the example transmitter 500 shown in FIG. 5 shows the first half of the symbols in order of the frequency-domain sequence forming the first portion 508, and the second half of the symbols in order forming the second portion 510, the symbols may be allocated to the first portion 508 and the second portion 510 in any manner provided that the portions are disjointed and each portion includes half of the symbols of the frequency-domain sequence.

The first portion 508 is input to a first real OFDM time-domain sequence generator 512 to generate a first time sequence 514 of real numbers based on the first portion 508. Similarly, the second portion 510 is input to a separate second real OFDM time-domain sequence generator 516 to generate a second time sequence 518 of real numbers. Because the first time sequence 514 and second time sequence 516 are separately generated based on independent portions of the frequency-domain sequence, the first time sequence and the second time sequence are decoupled from each other.

The first time sequence 514 is combined as the real component with the second time sequence 518 as the imaginary component. To do this, the second time sequence 518 is multiplied by the imaginary unit, j, by a multiplier 520 and added to the first time sequence 514 by an adder 522 to form the complex time-domain sequence 524.

The time-domain sequence 524 may then be input into a digital-to-analogue converter 526, an up-converter 528, and a power amplifier 530 before being transmitted via an antenna 532. The digital-to-analogue converter 526, the up-converter 528, and the power amplifier 530 may be substantially similar to the digital-to-analogue converter 120, the up-converter 122, and the power amplifier of the transmitter 100 shown in FIG. 1.

Figure 6A:
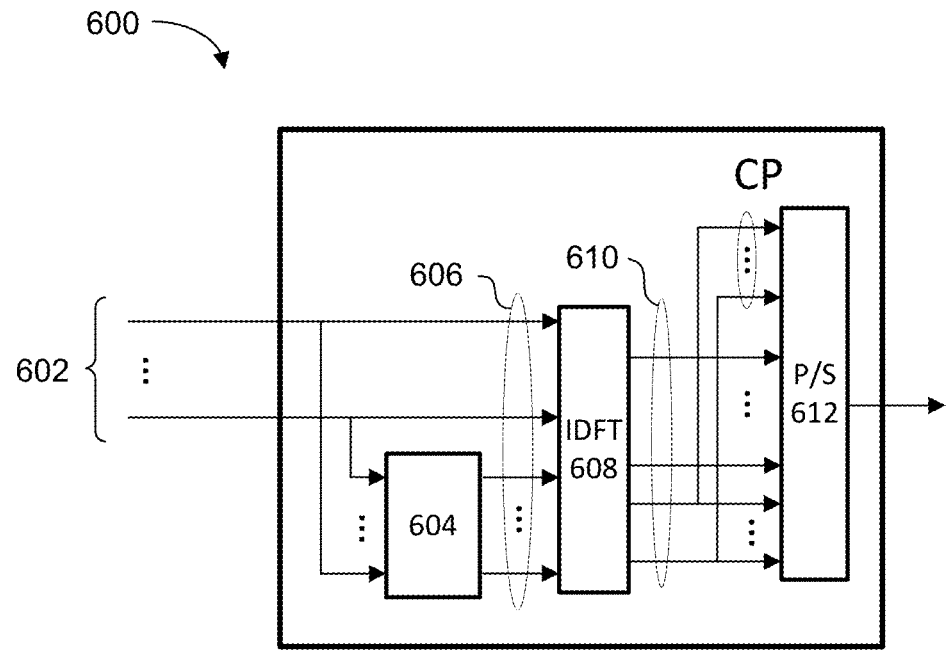
FIG. 6A is a schematic diagram of a real OFDM time sequence generator for the transmitter shown in FIG. 5 according to an embodiment.
Figure 6B:
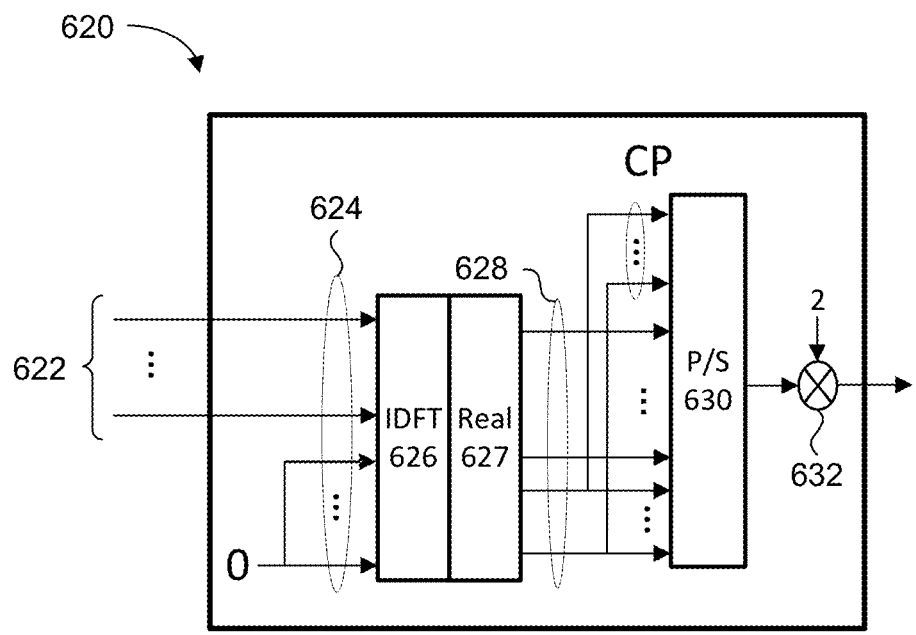
FIG. 6B is a schematic diagram of a real OFDM time sequence generator for the transmitter shown in FIG. 5 according to another embodiment.

FIGS. 6A and 6B show schematic diagrams of two examples of possible schemes for a real OFDM time sequence generator suitable for providing one or both of the first and second real OFDM time sequence generators 512, 514 shown in FIG. 5 in the case in which δ=0.5, i.e., when the IDFT operation is performed with a frequency offset equal to half of the subcarrier space.

The real OFDM time sequence generator 600 shown in FIG. 6A receives an input portion 602, which is one of the first portion 508 or second portion 510. The input portion 602 is expanded by a conjugator 604 to generate a conjugate symmetric sequence 606 of the input portion 602. An IDFT operation is performed on the conjugate symmetric sequence 606, represented by IDFT 608, to generate a time sequence 610 of real numbers. The time sequence 610, after padding with a CP sequence, is input to a parallel-to-serial switch 612. Thus, in the scheme illustrated in FIG. 6A, N/2 symbols, which include data symbols and pilot symbols, are directly used to modulate the first N/2 tones for an IDFT operation, while the other N/2 tones are set to the symmetric conjugates of other tones as indicated by equation (18).

The real OFDM time sequence generator 620 shown in FIG. 6B also receives an input portion 622, which is one of the first portion 508 or second portion 510. The input portion 622 is expanded by adding a sequence of zero elements to the end of the input portion 622 to generate an expanded sequence 624.

Although the consecutive zero elements may also be included as the first elements of the expanded sequence 624 in the case in which δ=0.5, rather than at the end of the expanded sequence as shown in FIG. 6B, this alternative results in increased complexity at the receiver in order to demodulate the time-domain sequence. Therefore, in practice, it is desirable that the sequence of zeros be added as consecutive zero elements at the end of the expanded sequence 624, i.e., to form the back half of the expanded sequence 624, as shown in the example in FIG. 6B.

An IDFT operation is performed on the expanded sequence 624, represented IDFT 626, and the real portion of the result of the IDTF is separated, as represented by block, to generate a time sequence 628 of real numbers. The time sequence 628, after padding with a CP sequence, is input to a parallel-to-serial switch 630. Thus, in the scheme illustrated in FIG. 6B, the last N/2 tones of the first or second portions are set to zeros, so that the sequence of $\{S_k\}$ forms a single-side band (SSB) signal. Further, only the real part of the IDFT operation output is used as the time sequence $\{s_n\}$.

FIG. 6B shows an optional scaling by a factor of two performed by a multiplier 632. This scaling is performed in order for the output of the real OFDM time sequence generator 620 to be equal to the output of the real OFDM time sequence generator 600 shown in FIG. 6A for a given input portion. However, this scaling could be omitted, in which case the receiver may need to be configured to account for this factor of two scaling when demodulating the signal when received.

The first and second real OFDM time sequence generators 512, 514 shown in the transmitter 500 may be the same, for example both may be the real OFDM time sequence generator 600 shown in FIG. 6A. Alternatively, the first and second real OFDM time sequence generators 512, 514 shown in the transmitter 500 may be different. For example the first real OFDM time sequence generator 512 may be the real OFDM time sequence generator 600 shown in FIG. 6A, and the second real OFDM time sequence generator 514 may be the real OFDM time sequence generator 620 shown in FIG. 6B.

Figure 7A:
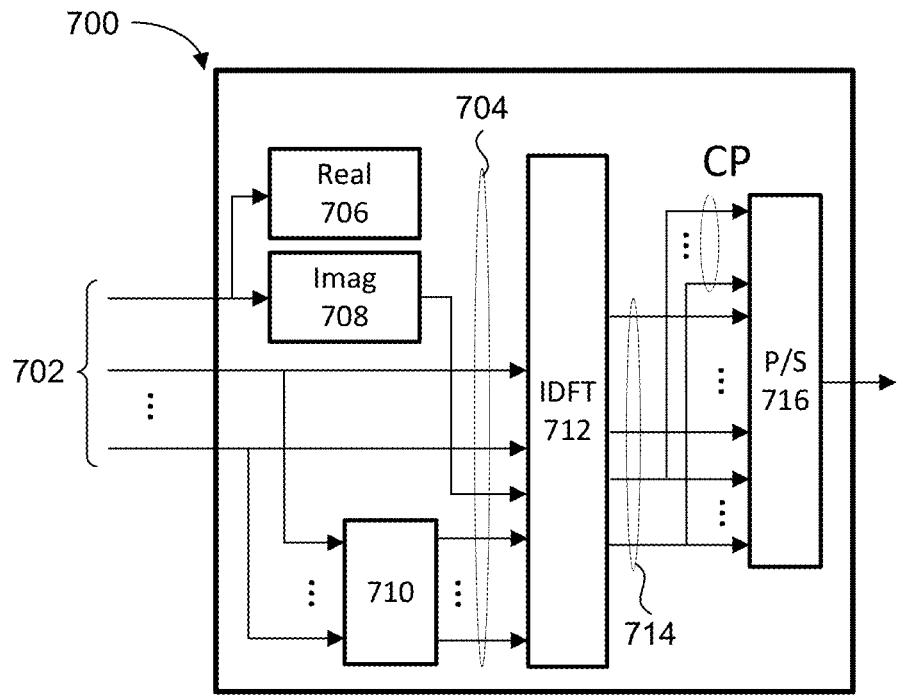
FIG. 7A is a schematic diagram of a real OFDM time sequence generator for the transmitter shown in FIG. 5 according to another embodiment.
Figure 7B:
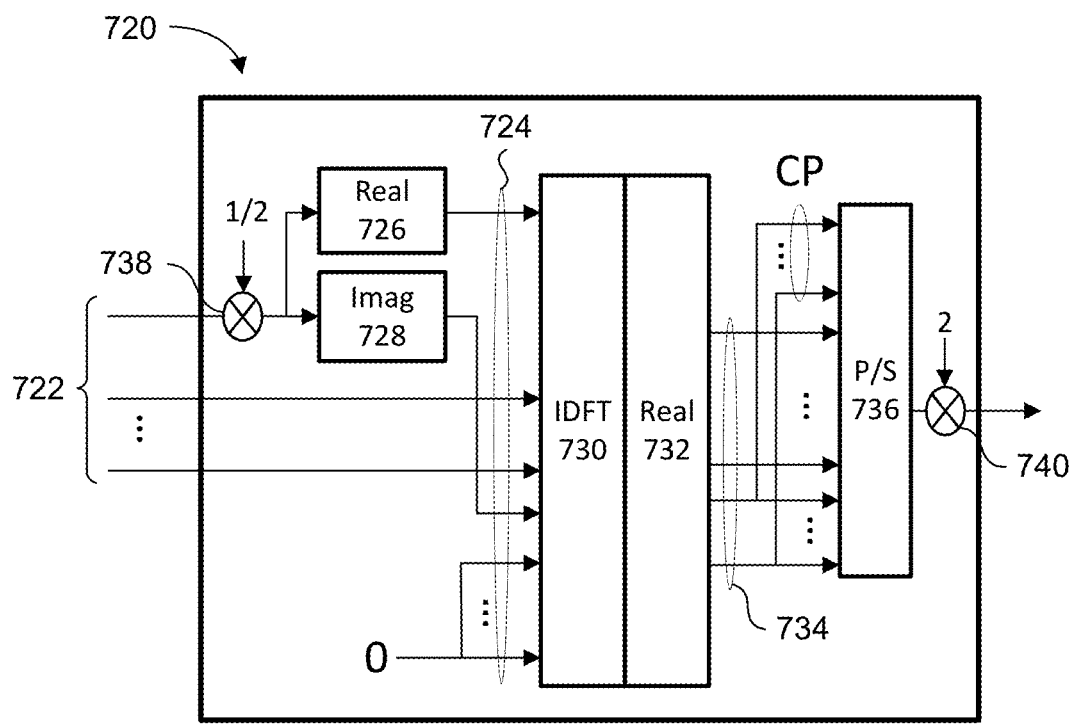
FIG. 7B is a schematic diagram of a real OFDM time sequence generator for the transmitter shown in FIG. 5 according to another embodiment.

FIGS. 7A and 7B show schematic diagrams of two examples of possible schemes for a real OFDM time sequence generator suitable for providing one or both of the first and second real OFDM time sequence generators 512, 514 shown in FIG. 5 in the case in which δ=0, i.e., when the IDFT operation is performed without a frequency offset.

The real OFDM time sequence generator shown in FIG. 7A receives an input portion 702, which is one of the first portion 508 or second portion 510. The input portion 702 is expanded to generate a conjugate symmetric sequence 704 by first separating the real and imaginary parts of the $0^{th}$ symbol, represented by blocks 706 and 708, including the real part as the $0^{th}$ symbol of the conjugate symmetric sequence 704 and including the imaginary part as a new symbol at the end of the input portion 702, i.e. the symbol immediately following the last symbol of the input portion 702. The remaining symbols for forming the expanded sequence 704 are generated by conjugator 710 which includes the symmetric conjugates for the remaining symbols of the conjugate symmetric sequence 704, as indicated by equation (19c). Similar to the real OFDM time sequence generator 600 shown in FIG. 6A, an IDFT operation is performed on the conjugate symmetric sequence 704, represented by IDFT 712 to generate a time sequence 714 of real numbers. The time sequence 714, after padding with a CP sequence, is input to a parallel-to-serial switch 716.

Thus, in the scheme illustrated in FIG. 7A, the real and imaginary parts of the first symbol are used as $S_0$ and $S_{N/2}$ respectively, and the last N/2-1 tones are set to the symmetric conjugates of other tones as indicated by equation (19c).

In the real OFDM time sequence generator 720 shown in FIG. 7B, input portion 722 is expanded to generate an expanded sequence 724 by first separating the real and imaginary parts of the $0^{th}$ symbol, represented by blocks 726 and 728, including the real part as the $0^{th}$ symbol of the expanded sequence 724 and including the imaginary part as a new symbol at the end of the input portion 722, i.e. the symbol immediately following the last symbol of the input portion 722. A sequence of zeros is included after the new element to generate the remaining symbols of the expanded sequence 724. Similar to the real OFDM time sequence generator 620 shown in FIG. 6B, an IDFT operation is performed on the expanded sequence 724, represented by IDFT 730, and the real portion of the result of the IDTF may be separated, as represented by block 732, to generate a time sequence 734 of real numbers. The time sequence 734, after padding with a CP sequence, is input to a parallel-to-serial switch 736.

Thus, in the scheme illustrated in FIG. 7B the last N/2-1 tones are set to zeros, so that the sequence of $\{S_k\}$ defines a SSB signal. Finally only the real part of the IDFT output is used as the time sequence $\{s_n\}$.

The real OFDM time sequence generator 720 also include an optional ½ scaling of the $0^{th}$ symbol of the input portion 722 by a first multiplier 738 followed by a an optional scaling by a factor of two of the output of the parallel-to-serial switch 736 by a second multiplier 740. These optional scaling factors are included so that output of the real OFDM time sequence generator 720 is equal to the output of the real OFDM time sequence generator 700 shown in FIG. 7A for a given input portion. However, this scaling could be omitted, in which case the receiver may need to account for this scaling when demodulating the received signal.

Similar to the above description with regard to FIGS. 6A and 6B, any combination of the real OFDM time sequence generators 700 and 720 may be utilized to provide the real OFDM time sequence generators 512 and 514 of the transmitter 500 shown in FIG. 5.

Note that in FIG. 6A and FIG. 7A, the N/2 input symbols, in addition to including pilot symbols, may come from or be sending to a single user or multiple different users. In any case, the sequence $\{S_k\}$ in FIG. 6A and FIG. 7A applied to the IDFT operation must be of conjugate symmetry as indicated by equations (18) and (19).

Figure 8:
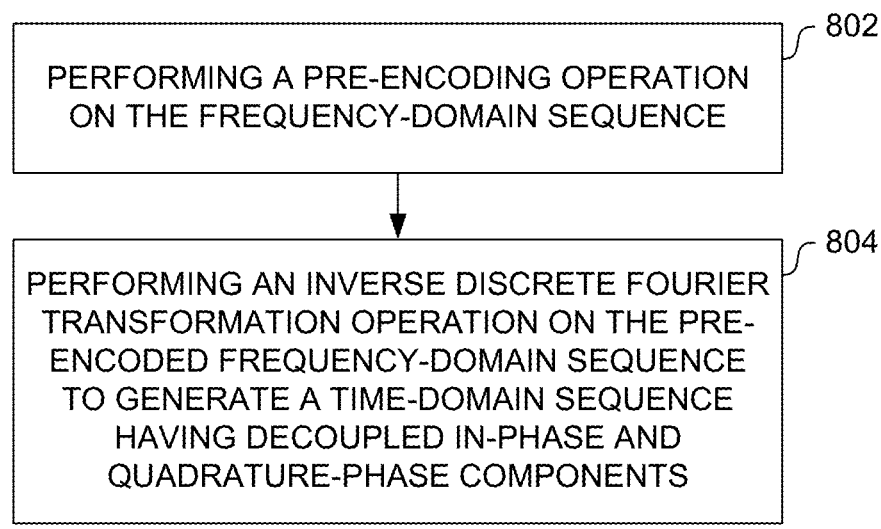
FIG. 8 is a flow chart illustrating a method for generating a time-domain sequence according to another embodiment.

Referring now to FIG. 8, a flow chart illustrating the second method for generating the time-domain sequence having decoupled in-phase and quadrature-phase components is shown. The method may be carried out by, for example, by software executed by a processor, or by hardware, or by a combination of software and hardware.

At 802, a pre-encoding operation is performed on the frequency-domain sequence. The pre-encoding operation performed at 802 is designed such that the resultant complex OFDM signal (generated by a regular IDFT operation) has the desired I-Q decoupled property, and is discussed in more detail below. At 804, an IDFT operation is performed on the pre-encoded frequency-domain sequence to generate a time-domain sequence having decoupled in-phase and quadrature-phase components.

Figure 9:
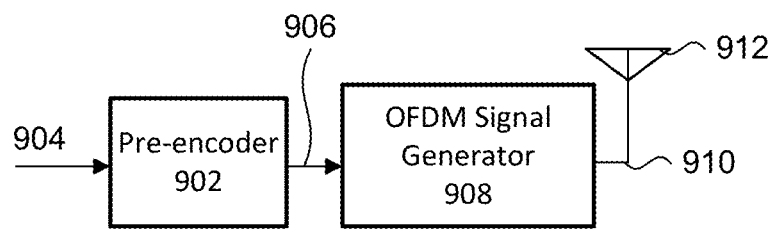
FIG. 9 is a schematic diagram of a transmitter for performing the method of DC-OFDM modulation shown in FIG. 8 according to an embodiment.

FIG. 9 shows a schematic diagram of a transmitter 900 for performing the method shown in FIG. 8. The transmitter includes a pre-encoder 902 in which an input sequence 904 is pre-encoded to generate a pre-encoded sequence 906. The pre-encoded sequence 906 is pre-encoded by the generator such that, when input into a standard OFDM signal generator 908, the output time-domain sequence 910 includes a decoupled in-phase and quadrature-phase components. The time-domain sequence 910 is then transmitted via an antenna 912. The standard OFDM signal generator 908 may include, for example, the IDFT 114, the serial-to-parallel switch 118, the digital-to-analogue converter 120, the up-converter 122, and the power amplifier 124 of the transmitter 100 shown in FIG. 1.

Pre-encoding is based on the linear property of the DFT-IDFT operations such that, rather than performing a summation of two real OFDM sequences by the transmitter 500 described above, the summation may alternatively be performed before the IDFT operation is performed such that the generated time-domain sequence exhibits decoupled in-phase and quadrature-phase components. This summation prior to performing to IDFT is referred to herein as pre-encoding.

Therefore, the only difference between the transmitter 900 in FIG. 9 and a traditional OFDM transmitter, such as the traditional OFDM transmitter 100 in FIG. 1, is that transmitter 900 includes a pre-encoder 902 inserted before IDFT operation is performed. Thus, in practice a regular OFDM transmitter, such as the transmitter 100, can be easily updated or switched into a DC-OFDM transmitter by simply inserting the pre-encoder 902 before an IDFT operation is performed.

Figure 10A:
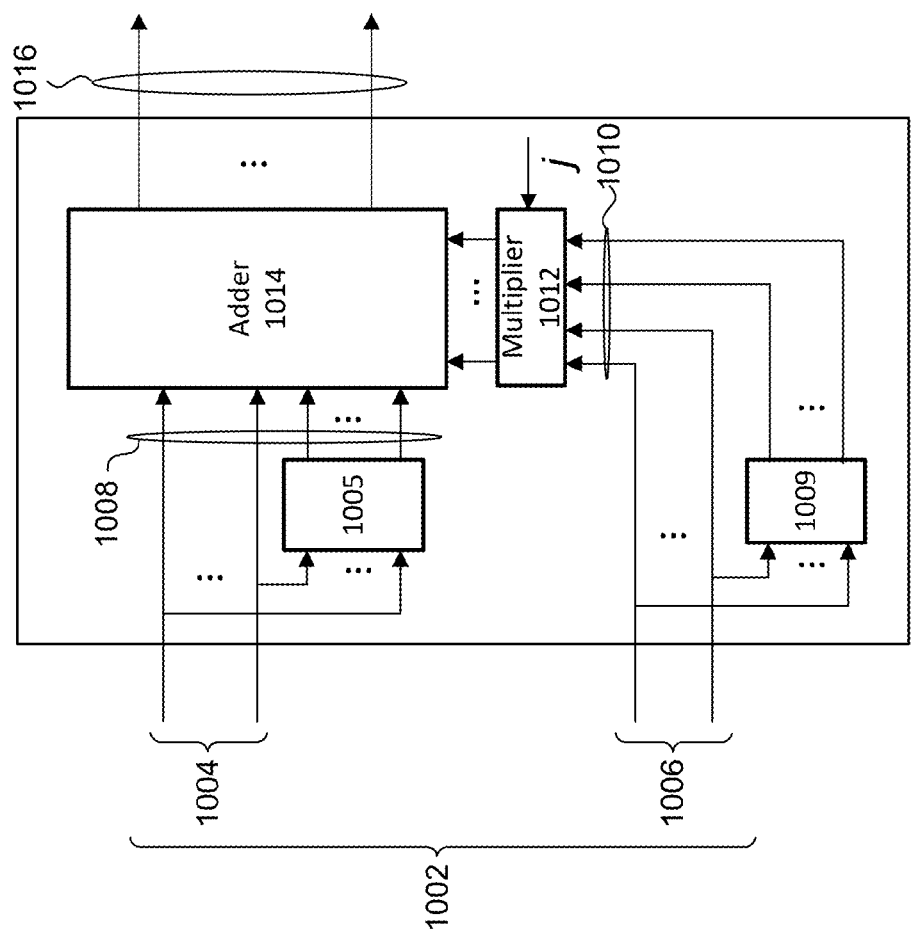
FIG. 10A is a schematic diagram of pre-encoder for the transmitter shown in FIG. 9 according to an embodiment.

FIG. 10A shows a pre-encoder 1000 for the case in which δ=0.5, i.e., in which the IDFT operation is performed with a frequency offset equal to half of the subcarrier spacing. An input sequence 1002 of complex symbols is separated into a first portion 1004 and a second portion 1006. The input sequence 1002 may be, for example, the same as the output of the serial-to-parallel switch 110 shown in the transmitter 100 in FIG. 1. The first portion 1004 expanded by an expander 1005 to form a respective first symmetric conjugate sequence 1008 and the second portion 1006 is separately expanded by a second expander 1009 to form a second symmetric conjugate sequence 1010. The process for generating the symmetric conjugate sequences is the same as described above with reference to FIG. 6A and therefore is not further described here. The second symmetric conjugate sequence 1010 is multiplied by an imaginary unit, j, by multiplier 1012 and combined with the first symmetric conjugate sequence 1008 by adder 1014 to form a pre-encoded frequency-domain sequence 1016.

The elements, $S_k$, of the pre-encoded frequency-domain sequence 1016 output by the pre-encoder 1000 are given by:

$$S_k = \begin{cases} S_{k,1} + jS_{k,2}, & k = 0, 1, N/2 - 1 \\ S^*_{N-k-1,1} + jS^*_{N-k-1,2}, & k = N/2, \ldots, N-1 \end{cases} \quad (20a)$$

Figure 10B:
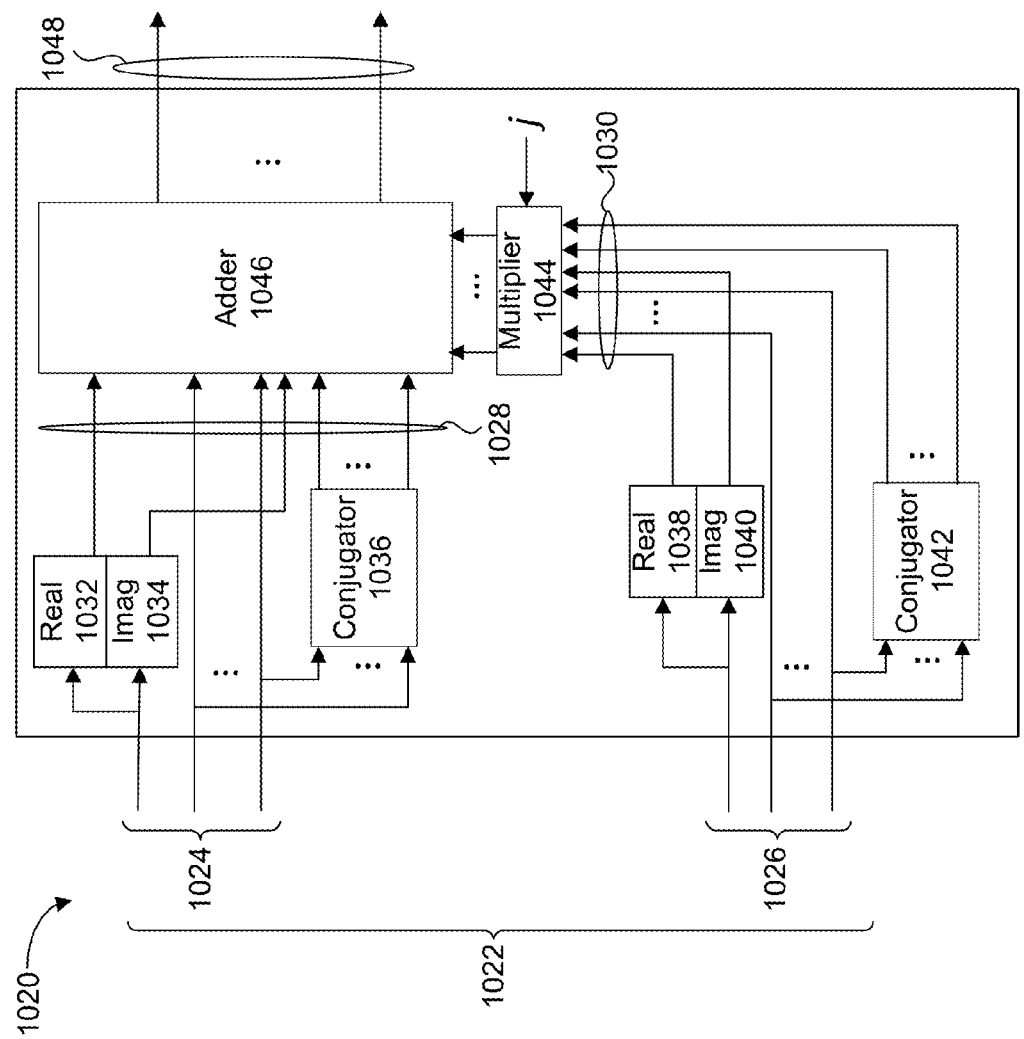
FIG. 10B is a schematic diagram of pre-encoder for the transmitter shown in FIG. 9 according to another embodiment.

FIG. 10B shows a schematic diagram of a pre-encoder 1020 for the case in which δ=0, i.e., in which the IDFT operation is performed without a frequency offset. An input sequence 1022 of complex symbols is separated into a first portion 1024 and a second portion 1026. Similar to the input sequence 1002 described previously, the input sequence 1022 may be, for example, the same as the output of the serial-to-parallel switch 110 shown in the transmitter 100 in FIG. 1. The first portion 1024 and the second portion 1026 are separately expanded to form a respective first expanded sequence 1028 and a second expanded sequence 1030.

The process for generating the first expanded sequence 1028 is performed by separating the $0^{th}$ element of the first portion 1024 into the real and imaginary components, represented by Real 1032 and Imag 1034, and determining a conjugate of the other elements by a conjugator 1036, similar to the expansion performed by the real OFDM time generator 700 disclosed above with reference to FIG. 7A. Similarly, the process for generating the second expanded sequence 1030 is performed by separating the $0^{th}$ element of the second portion 1026 into the real and imaginary components, represented by Real 1038 and Imag 1040, and determining a conjugate of the other elements by a conjugator 1042.

The second expanded sequence 1030 is multiplied by an imaginary unit, j, by multiplier 1044 and combined with the first expanded sequence 1028 by adder 1046 to form a pre-encoded frequency-domain sequence 1048. The elements, $S_k$, of the pre-encoded frequency-domain sequence 1048 output by the pre-encoding 1020 are given by:

$$S_k = \begin{cases} \text{Re}\{S_{0,1}\} + j\text{Re}\{S_{0,2}\}, & k = 0 \\ \text{Im}\{S_{0,1}\} + j\text{Im}\{S_{0,2}\}, & k = N/2 \\ S_{k,1} + jS_{k,2}, & k = 1, 2, \ldots N/2 - 1 \\ S^*_{N-k,1} + jS^*_{N-k,2}, & k = N/2 + 1, \ldots, N-1 \end{cases} \quad (20b)$$

Figure 11:
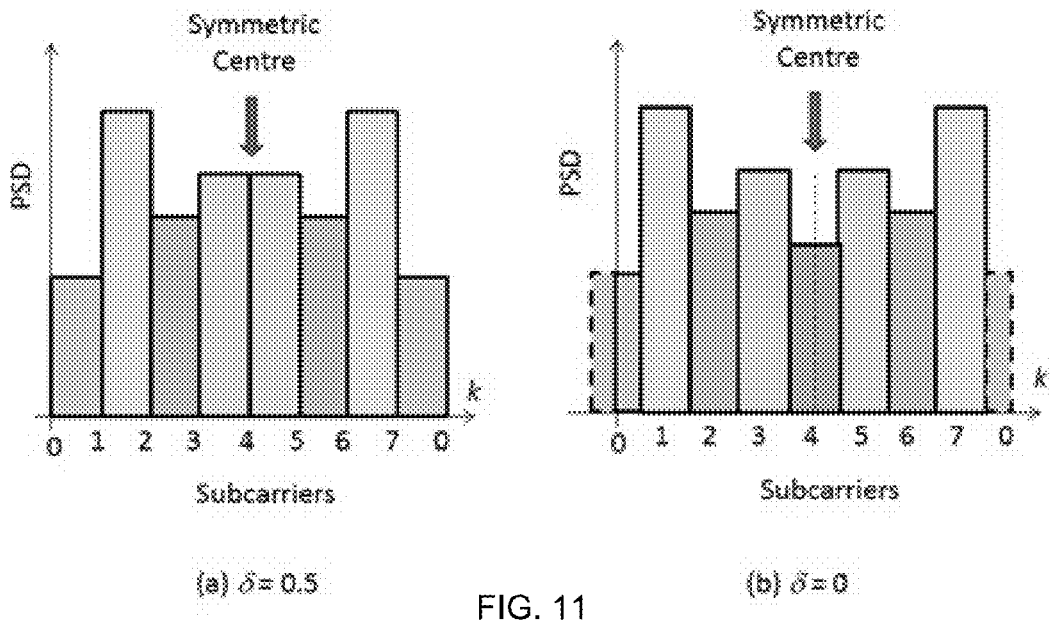
FIG. 11 is an example power spectrum DC-OFDM modulation.

As an illustrative example, the power spectrum of the real and imaginary components of the generated DC-OFDM signal with eight subcarriers is shown in FIG. 11, where (a) is for the case in which δ=0.5 while (b) for the case in which δ=0. For each of the two components, the spectrum is symmetric about the center, and the symmetric tones are modulated by a complex symbol and its conjugate. Note that the condition for tones to be modulated by a complex symbol and its conjugate applies to all subcarriers including the pilot tones.

In order to illustrate the above described methods of generating a DC-OFDM time-domain sequence, consider the frequency-domain sequence of the following eight-point data sequence of 16-QAM symbols:

S=[3−3j, −3−j, 3−3j, 3−3j, −1−3j, 3+3j, −3−j, −1−j].

As described above, we first separate S into two non-overlapped portions which may be given by, for example:

$S_1$=[3−3j, −3−j, 3−3j, 3−3j]
and
$S_2$=[−1−3j, 3+3j, −3−j, −1−j].

In this example, the first portion $S_1$ includes the first four numbers, i.e., the first half, of the frequency-domain sequence S, and the second portion $S_2$ includes the final four numbers, i.e., the second half, of the frequency-domain sequence S. However, as described above, the numbers of the frequency-domain sequence S may be separated between the first portion $S_1$ and the second portion $S_2$ in any way provided that the first portion $S_1$ and the second portion $S_2$ each include half of the numbers of the frequency-domain sequence S and are non-overlapping, or disjointed.

In an example, DC-OFDM modulation is performed by the real OFDM time sequence generator 600 shown in FIG. 6A. The first portion $S_1$ and the second portion $S_2$ are expanded to generate a first eight-point conjugate symmetric sequence $S'_1$ and a second eight-point conjugate symmetric sequence $S'_2$ as described above. For the first portion $S_1$ and the second portion $S_2$ of this example, the conjugate symmetric sequences are:

$S'_1$=[3−3j, −3−j, 3−3j, 3−3j, 3+3j, 3+3j, −3+j, 3+3j]
and
$S'_2$=[−1−3j, 3+3j, −3−j, −1−j, −1+j, −3+j, 3−3j, −1+3j].

Next, an eight-point IDFT operation with δ=0.5 is individually performed on each the conjugate symmetric sequences $S'_1$ and $S'_2$ to output two eight-point time sequences, denoted as $s_1$ and $s_2$ respectively. The final complex time-domain sequence s is formed by $s=s_1+js_2$.

In another example, DC-OFDM modulation is performed by the real OFDM time sequence generator 620 shown in FIG. 6B. The first portion $S_1$ and the second portion $S_2$ are padded by including a sequence of four zeroes in at the end of each of the first portion $S_1$ and the second portion $S_2$ to generate respective expanded sequences $S'_1$ and $S'_2$. In other words, the four consecutive zeros are added as the last four elements, such that:

$S'_1$=[3−3j, −3−j, 3−3j, 3−3j, 0, 0, 0, 0]
and
$S'_2$=[−1−3j, 3+3j, −3−j, −1−j, 0, 0, 0, 0].

Next, an eight-point IDFT operation with δ=0.5 is individually performed on each the expanded sequences $S'_1$ and $S'_2$ to output two eight-point time sequences of complex numbers, with their real components being denoted as $s_1$ and $s_2$ respectively. The final complex time-domain sequence s is formed using the two time sequences such that $s=s_1+js_2$.

In another example, DC-OFDM modulation is performed by the real OFDM time sequence generator 700 shown in FIG. 7A. First, the imaginary part of the zeroth element is removed and included as a new element at the end of the sequence for each of the first portion $S_1$ and the second portion $S_2$, that is:

$S_1$=[3, −3−j, 3−3j, 3−3j, −3]
and
$S_2$=[−1, 3+3j, −3−j, −1−j, −3].

Next, the first portion $S_1$ and the second portion $S_2$ are each expanded to generate respective first and second conjugate symmetric sequences $S'_1$ and $S'_2$ based on the remaining elements, i.e., the elements other than the zeroth element and the new element. The first and second conjugate symmetric sequences $S'_1$ and $S'_2$ are:

$S'_1$=[3, −3−j, 3−3j, 3−3j, −3, 3+3j, 3+3j, −3+j]
and
$S'_2$=[−1, 3+3j, −3−j, −1−j, −3, −1+j, −3+j, 3−3j].

An 8-point IDFT operation with δ=0 is individually performed on each the expanded sequences $S'_1$ and $S'_2$ to output two eight-point time sequences, denoted as $s_1$ and $s_2$ respectively. The final complex time-domain sequence s is formed using the two time sequences such that $s=s_1+js_2$.

In another example, DC-OFDM modulation is performed by the real OFDM time sequence generator 720 shown in FIG. 7B. First, the imaginary part of the zeroth element is removed and included as a new element at the end of the sequence for each of the first portion $S_1$ and the second portion $S_2$, that is:

$S_1=[3/2, -3-j, 3-3j, 3-3j, -3/2]$ and $S_2=[-1/2, 3+3j, -3-j, -1-j, -3/2]$.

In this example, the zeroth element is scaled by a factor of ½ but, as described above, this scaling is optional. Next, the first portion $S_1$ and the second portion $S_2$ are padded by including a sequence of three zeroes in at the end of each of the first portion $S_1$ and the second portion $S_2$ to generate respective expanded sequences $S'_1$ and $S'_2$. In other words, the three consecutive zeros are added as the last three elements after the new element, such that:

$S'_1=[3/2, -3-j, 3-3j, 3-3j, -3/2, 0, 0, 0]$ and $S'_2=[-1/2, 3+3j, -3-j, -1-j, -3/2, 0, 0, 0]$.

An eight-point IDFT operation with $\delta=0$ is individually performed on each the expanded sequences $S'_1$ and $S'_2$ to output two eight-point time sequences of complex numbers, with their real components being denoted as $s_1$ and $s_2$ respectively. The final complex time-domain sequence s is formed using the two time sequences such that $s=s_1+js_2$.

In another example, the DC-OFDM modulation is performed by the pre-encoder 1000 shown in FIG. 10A. First, the first portion $S_1$ and the second portion $S_2$ are each expanded to generate a first eight-point conjugate symmetric sequence $S'_1$ and a second eight-point conjugate symmetric sequence $S'_1$ as described above:

$S'_1=[3-3j, -3-j, 3-3j, 3-3j, 3+3j, 3+3j, -3+j, 3+3j]$ and $S'_2=[-1-3j, 3+3j, -3-j, -1-j, -1+j, -3+j, 3-3j, -1+3j]$.

Next, a pre-encoded frequency-domain sequence, S, of complex numbers is formed by $S=S'_1+jS'_2$. Then an eight-point IDFT operation with $\delta=0.5$ is performed on the pre-encoded frequency-domain sequence S to obtain a time-domain sequence, $s=\text{IDFT}(S)$, that has decoupled in-phase and quadrature-phase components.

In another example, the DC-OFDM modulation is performed by the pre-encoder 1020 shown in FIG. 10B. First, the imaginary part of the zeroth element is removed and included as a new element at the end of the sequence for each of the first portion $S_1$ and the second portion $S_2$, that is:

$S_1=[3, -3-j, 3-3j, 3-3j, -3]$ and $S_2=[-1, 3+3j, -3-j, -1-j, -3]$.

Next, the first portion $S_1$ and the second portion $S_2$ are each expanded to generate respective first and second conjugate symmetric sequences $S'_1$ and $S'_2$ based on the remaining elements, i.e., the elements other than the zeroth element and the new element. The first and second conjugate symmetric sequences $S'_1$ and $S'_2$ are:

$S'_1=[3, -3-j, 3-3j, 3-3j, -3, 3+3j, 3+3j, -3+j]$ and $S'_2=[-1, 3+3j, -3-j, -1-j, -3, -1+j, -3+j, 3-3j]$.

A pre-encoded frequency-domain sequence, S, is formed utilizing the first and second conjugate symmetric sequences $S'_1$ and $S'_2$ such that $S=S'_1+jS'_2$. Then an eight-point IDFT operation with $\delta=0$ is performed on the pre-encoded frequency-domain sequence S to obtain a time-domain sequence, $s=\text{IDFT}(S)$, that has decoupled in-phase and quadrature-phase components.

The processes utilized to demodulate the DC-OFDM signal in receivers include many common operations similar to those in a typical OFDM receivers like receiver 200 shown in FIG. 2. For example, DC-OFDM receivers may include automatic gain control (AGC), frequency, phase and timing synchronizations, as well as down-conversion of the received RF signal to baseband and further conversion to a discrete time sequence by an analogue-to-digital converter. A DFT operation is utilized to convert the received time-domain sequence to frequency-domain sequence. After a DFT operation, the frequency-domain sequence may include distortions. Therefore, frequency-domain equalization is generally utilized in DC-OFDM similar to OFDM receivers.

When demodulating DC-OFDM signals in a receiver, the in-phase and quadrature-phase components of the time-domain sequence must be separated correctly. Separation of the in-phase and quadrature-phase components can be performed in the time-domain before the DFT operation is performed or in the frequency-domain after the DFT operation.

Figure 12:
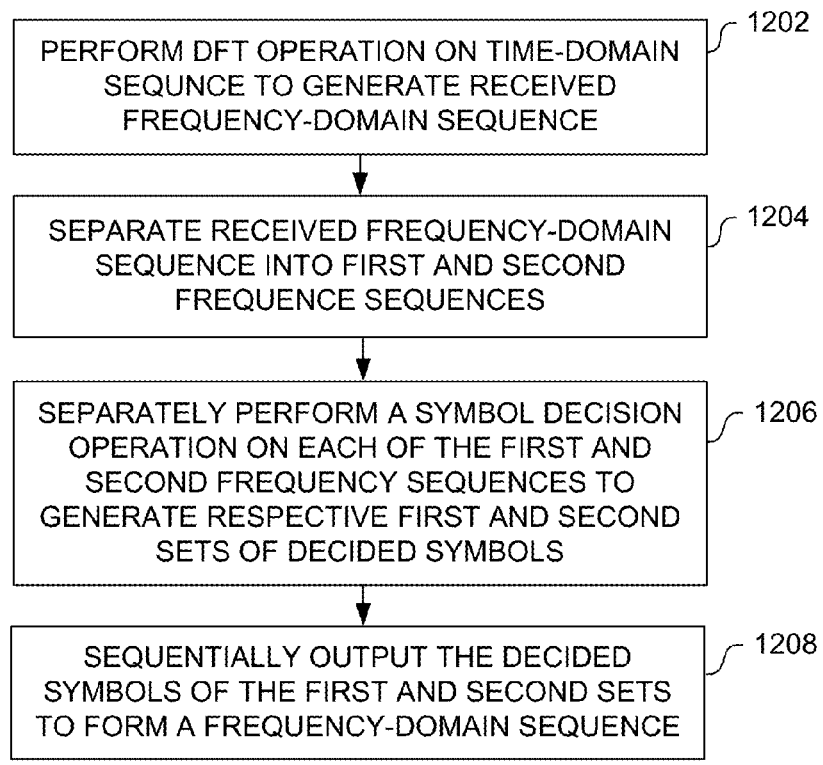
FIG. 12 is a flow chart illustrating a method for performing DC-OFDM demodulation according to an embodiment.

FIG. 12 shows flow chart illustrating a method for DC-OFDM demodulating. The method may be carried out by, for example, by software executed by a processor, or by hardware, or by a combination of software and hardware.

At 1202 a DFT operation is performed on a received time-domain sequence to generate a received frequency-domain sequence. At 1204, the received frequency-domain sequence is separated into a first frequency sequence and a second frequency sequence. At 1206, a symbol decision operation performed on each of the first frequency sequence to generate a first set of decided symbols and another symbol decision operation is separately performed on the second frequency sequence to generate a second set of decided symbols. At 1208, the decided symbols in the first set and the second set are sequentially output to for a frequency-domain sequence. The frequency-domain sequence may then undergo a symbol-to-bit demapping operation to obtain the data bit stream.

Figure 13:
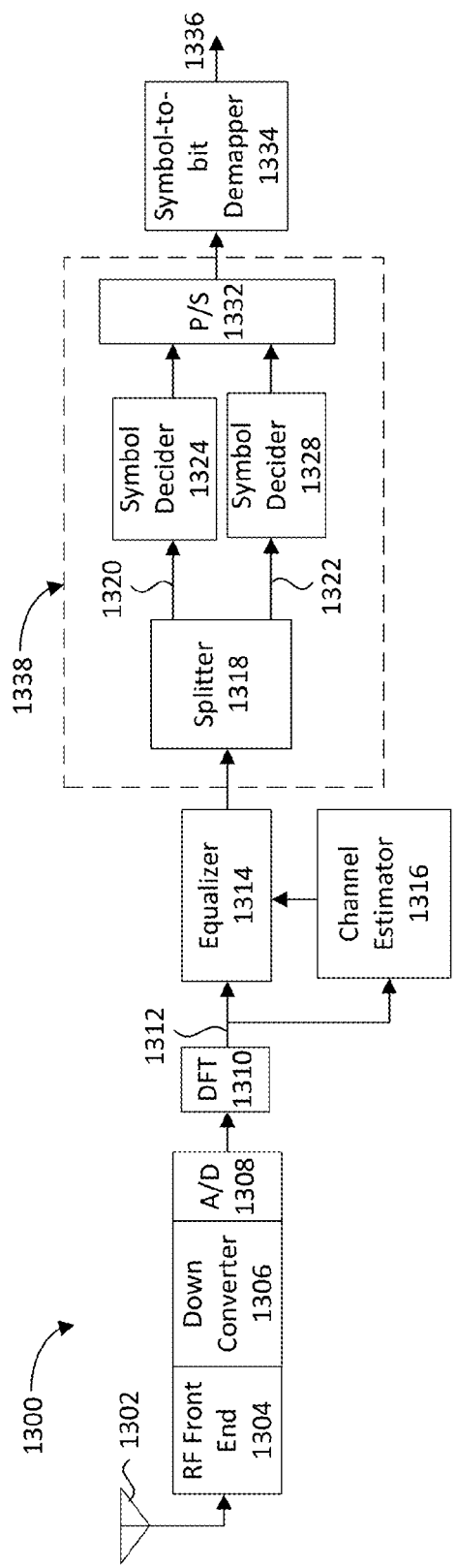
FIG. 13 is a schematic diagram of a receiver for performing the method of DC-OFDM demodulation shown in FIG. 12 according to an embodiment.

FIG. 13 is a schematic diagram of an example DC-OFDM receiver 1300 for performing the example method illustrated in FIG. 12. The DC-OFDM receiver 1300 includes an antenna 1302 for receiving a received time-domain sequence. The DC-OFDM receiver 1300 may include pre-processing elements, for example, an RF front end 1304, a down converter 1306 and analogue-to-digital converter 1308. These elements may be substantially similar to the RF front end 204, down converter 206 and analogue-to-digital converter 208 of traditional receiver 200 described above with reference to FIG. 2. A DFT operation 1310 is performed on the time-domain sequence, represented by DFT 1310, to generate a received frequency-domain sequence 1312, which is $\hat{S}_k$ in equation (17) describe above. An optional equalization operation may be performed on the received frequency-domain sequence 1312 by equalizer 1314 and channel estimator 1316, similar to the equalization performed by the equalizer 214 and channel estimator 216 of the receiver 200 described above.

The received frequency-domain sequence is then separated by a splitter 1318 into a first frequency sequence 1320 and a second frequency sequence 1222. The output of the splitter 1318, in the case in which the DFT operation is performed with a frequency offset equal to half of the subcarrier spacing, i.e., for $\delta=0.5$, is:

$$\begin{cases} \tilde{S}_{k,1} = \frac{1}{2}(\tilde{S}_k + \tilde{S}^*_{N-k-1}) \\ \tilde{S}_{k,2} = \frac{1}{2j}(\tilde{S}_k - \tilde{S}^*_{N-k-1}) \end{cases} \quad (21a)$$

for k=0, 1, . . . , N/2-1, where $\tilde{S}_{k,1}$ is the first frequency sequence 1320, and $\tilde{S}_{k,2}$ is the second frequency sequence 1322. The outputs set out in equation (20a) correspond to equation (20a) described previously.

The output of the splitter 1318 in the case in which the DFT operation is performed without frequency offset, i.e., for δ=0, is: corresponding to (20b), we have $$\begin{cases} \tilde{S}_{0,1} = \text{Re}\{\tilde{S}_0\} + j\text{Re}\{\tilde{S}_{N/2}\} \\ \tilde{S}_{0,2} = \text{Im}\{\tilde{S}_0\} + j\text{Im}\{\tilde{S}_{N/2}\} \\ \tilde{S}_{k,1} = \frac{1}{2}(\tilde{S}_k + \tilde{S}^*_{N-k}), \quad k = 1, \ldots, N/2-1 \\ \tilde{S}_{k,2} = \frac{1}{2j}(\tilde{S}_k - \tilde{S}^*_{N-k}), \quad k = 1, \ldots, N/2-1 \end{cases} \quad (21b)$$

The output set out in equation (20b) corresponds to equation (20b) described previously.

A symbol decider 1324 generates a first set of decided symbols 1326 based on the first frequency sequence 1320, and a second symbol decider 1328 generates a second set of decided symbols 1330 based on the second frequency sequence 1322. The decided symbols of the first set 1326 and the second set 1330 are sequentially output by parallel-to-serial switch 1332 to form the frequency-domain sequence, which may then be utilized by symbol-to-bit demapper 1334 to obtain the data bit stream 1336.

In the example receiver 1300 shown in FIG. 13, the splitter 1318 and separate symbol decider 1324 and 1328 can be referred to as a DC-OFDM de-coder 1338 which may be included in place of the symbol decider in a traditional receiver such as, for example, symbol decider 216 in receiver 200 previously described with reference to FIG. 2. Thus, the de-coder could be easily incorporated into traditional OFDM receiver to easily update or switch the traditional receiver to perform DC-OFDM demodulation.

Referring now to FIG. 14, a flow chart illustrating an alternative method of performing DC-OFDM demodulating is shown. At 1402 a received time-domain sequence is separated into real and imaginary components. At 1404, a DFT operation, a combining operation, and a symbol decision operation are performed on the real component to generate a first set of decision symbols. At 1406, a DFT operation, a combining operation, and a symbol decision operation are performed on the imaginary component to generate a second set of decision symbols. At 1408, the decided symbols in the first set and the second set are sequentially output to for a frequency-domain sequence. The frequency-domain sequence may then undergo a symbol-to-bit demapping operation to obtain the data bit stream.

The combining operation is performed because information of each data symbol is carried by two sub-carriers, i.e. the $k^{th}$ subcarrier and the $(N-k-2\delta)^{th}$ subcarrier. Therefore, the combining combination combines the outputs of the two subcarriers to recover the information of each data symbol. The combining operation may utilize any suitable scheme, such as, for example, the maximum-ratio combiner (MRC).

FIG. 15 shows a schematic diagram of a DC-OFDM receiver 1500 for performing the method illustrated in FIG. 14. The DC-OFDM receiver 1500 includes an antenna 1502 for receiving a received time-domain sequence. The DC-OFDM receiver 1500 may include pre-processing elements, for example, an RF front end 1504, a down converter 1506 and analogue-to-digital converter 1508. As with the DC-OFDM receiver 1300 described with reference to FIG. 13, these elements may be substantially similar to the RF front end 204, down converter 206 and analogue-to-digital converter 208 of traditional receiver 200 described above with reference to FIG. 2.

The DC-OFDM receiver 1500 may optionally include an equalizer 1510 before the time-domain sequence is separated into real and imaginary components. In order to perform the equalization operation, a DFT operation is performed on the received time-domain sequence, represented by DFT 1512, so that an equalization operation can be performed in frequency-domain by the equalizer (EQ) 1514 and the channel estimator (CE) 1516. The output of the EQ 1514 is then converted back to the time-domain by an IDFT operation, represented by IDFT 1518.

The time-domain sequence is separated into a real component, represented by real block 1520, and an imaginary component, represented by the imaginary block 1522. A DFT operation is performed on the real component, represented by DFT 1524, followed by a combining operation performed by a combiner 1526 and a symbol decision operation performed by symbol decider 1528 to generate a first set of decided symbols 1530. Similarly, a DFT operation is performed on the imaginary component, represented by DFT 1532, followed by a combining operation performed by combiner 1534 and a symbol decision operation performed by a symbol decider 1538 to generate a second set of decided symbols 1538.

The decided symbols of the first set 1530 and the second set 1538 are sequentially output by a parallel-to-serial switch 1540 to form the frequency-domain sequence, which may then be utilized by a symbol-to-bit demapper 1542 to obtain the data bit stream 1544.

Because of the use of multiple DFT operations, the DC-OFDM receiver 1500 shown in FIG. 15 is generally more complex than receivers utilized in traditional OFDM, such as receiver 200 described above with reference to FIG. 2. By comparison, the DC-OFDM receiver 1300 shown in FIG. 13 includes a single DFT operation because the data stream is separated in frequency domain, after any optional equalization is performed, and therefore performs DC-OFDM demodulation with less complexity compared to receiver 1500 shown in FIG. 15.

As state above, the described methods for DC-OFDM modulation and demodulation are applicable to both single user and multi-user (MU) applications. The previously described problem in MU OFDM of inter-user interference due to I-Q imbalance may be addressed by employing one of the following schemes.

1) Modulating the tones exclusively associated with the in-phase component using the data associated with one group of users, and modulating the tones exclusively associated with the quadrature-phase component using a second group of user that are the users not included in the first group. An example of this first scheme is illustrated in FIG. 16 for two users, User 1 and User 2. The data associated with User 1 is used to generate the real component, or I-component, of the time-domain sequence, and the data associated with User 2 is used to generate the imaginary component, or Q-component. For example, in the method illustrated in FIG. 3, the first portion used to generate the in-phase component comprises the data symbols associated with User 1, and the second portion used to generate quadrature-phase component comprises the data symbols associated with User 2. While FIG. 16 illustrates the subcarrier allocation for δ=0.5, this first scheme is also applicable to δ=0. FIG. 17 illustrates an example of this first scheme for four users. In this example, the data associated with a first group of users, User 1 and User 2, are utilized to modulate the tones of the in-phase component, while data associated with a second group of users, User 3 and User 4, are utilized to modulate the tones of the quadrature-phase component. Within each of the in-phase and quadrature-phase components, symmetric tones are always allocated to the same user.

2) Using the data associated with each user to modulate a portion of the tones associated with both the in-phase and quadrature-phase components of the time-domain sequence. In this second scheme, symmetric tones are always associated with the same user. An example of this second scheme is illustrated in FIG. 18 for two users. In the example, Tones 0, 1, 6, and 7 are allocated to User 1, while Tones 2 to 5 are allocated to User 2. The same subcarrier allocation plan is employed for both in-phase and quadrature-phase components.

3) Using the data for each user to modulate a portion of the tones associated with the in-phase component with an allocation plan that is different than the allocation plan utilized for the tones associated with the quadrature-phase component. FIG. 19 shows an example of this third scheme for two users in the case in which $\delta=0.5$. In the example, Tones 0, 1, 6, and 7 are allocated to User 1 for the in-phase component while tones 2-5 are allocated to User 1 for the quadrature-phase component. Similarly, Tones 2-5 are allocated to User 2 for the in-phase component and Tones 0, 1, 6, and 7 are allocated to User 2 for the quadrature-phase component. FIG. 20 shows an example of this third scheme for the case in which $\delta=0$. In general, this third scheme provides better frequency diversity than the first and second schemes in which the same allocation plan is used for both the in-phase and quadrature-phase component because each user uses different subcarriers for in-phase and quadrature-phase components.

4) Using a combination of the three previously described schemes.

To combat I-Q imbalance impact, the input symbols for different users should be properly allocated to the N subcarriers in order to satisfy the condition of conjugate symmetry, i.e., satisfy equations (18) and (19). That is, both tones of a symmetric pair should be allocated to a same user, and be modulated by an input symbol and its conjugate. Thus, in all of the above-described schemes, both tones of each symmetric pair are exclusively allocated to a same user, and modulate the two tones of each symmetric pair with a data symbol and its conjugate respectively.

Described herein are methods and apparatuses for I-Q decoupled-OFDM in which the in-phase and quadrature-phase components of the time-domain sequence generated in the transmitter are each associated with an independent portion of the frequency-domain input data sequence. For each of the in-phase and quadrature-phase components, the subcarriers in frequency domain are modulated by symmetrical conjugate symbols. As a result, compared to the traditional OFDM modulation scheme, the proposed DC-OFDM is more robust to I-Q imbalance impairment.

FIG. 21 illustrates the power spectrum of a two-user DC-OFDM signal when I-Q imbalance occurs, in which the dashed lines indicate the spectrum levels produced by DC-OFDM without I-Q imbalance, and the solid lines indicate spectrum levels produced by DC-OFDM with I-Q imbalance. The difference between the dashed lines and the solid lines shows the spectrum magnitude changing due to the image leakage. I-Q imbalance results in the power spectrum magnitude of the DC-OFDM signal to be increased in the in-phase component, and decreased in quadrature-phase component, assuming $\beta>0$ in equations (9) and (10).

The differences are because of the leaking images due to I-Q imbalance. However, these leaking images do not interfere signal detection in the receiver, because in DC-OFDM, the leaking image at each tone is a scaled signal (with a scaling ratio $\beta$) that is exactly same as the signal allocated at the same tone.

In an example, N=8 and $\delta=0.5$, the symbol applied to Tone 2 for each of the in-phase and quadrature-phase components is $S_2=1+3j$. Therefore, the symbol applied to the symmetric tone, Tone 5, is the conjugate of $S_2$, i.e. $S_5=S_2^*=1-3j$. When I-Q imbalance occurs, the image leaking from Tone 2 to Tone 5 is $\beta S_2^*=\beta(1-3j)$. As a result, the signal of Tone 5 becomes $(1\pm\beta)(1-3j)$, which is a scaled version of the desired signal of Tone 5, where "+" is for the in-phase component and "−" is for the quadrature-phase component. In this example, $\alpha=1$ is assumed in equation (17).

Similarly, the image leaking from Tone 5 to Tone 2 is $\beta S_5^*=\beta(1+3j)$. As a result, the signal of Tone 2 becomes $(1\pm\beta)(1+3j)$, which is a scaled version of the desired signal of Tone 2.

This example illustrates that with image leakage due to I-Q imbalance, no inter-subcarrier interference between two symmetric subcarriers occurs in DC-OFDM.

Furthermore, with leaking images added to each tone, the resultant signals of Tone 2 and Tone 5 are still conjugate symmetric with equal magnitudes. This means that each of in-phase and quadrature-phase components in time-domain is still a real sequence, implying that there is no interference between the in-phase and quadrature-phase components. As a result, in DC-OFDM the impact of I-Q imbalance is removed in the sense that there is no inter-subcarrier interference due to I-Q imbalance in both single-user and multi-user cases. In addition, there is no inter-user interference due to I-Q imbalance in MU applications. Though the example shown in FIG. 21 is for the case in which $\delta=0.5$, the above analysis is applicable to the case of $\delta=0$.

FIG. 22 shows the constellations, obtained in simulation without equalization, of the recovered frequency-domain data sequences in a regular OFDM receiver (marked by the x) and a DC-OFDM receiver (marked by the apteryxes, *) with 64QAM for each tone and with −20 dB I-Q imbalance. FIG. 22 shows that, in regular OFDM, the recovered symbols, indicated by the x's, are scattering in a wide range around each QAM point. This is because of image leakage due to I-Q imbalance, which results in a sort of inter-subcarrier interference. By contrast, in DC-OFDM, the recovered symbols, indicated by the *'s, are focusing on two points near each QAM point. The two apteryxes around each QAM constellation point correspond to the in-phase component and the quadrature-phase component in time domain. The in-phase and quadrature-phase components correspond to the two data portions (each with N/2 data symbols) in frequency domain, with a magnitude of $(1+\beta)S_k$ and $(1-\beta)S_k$, respectively.

By comparing the magnitude of received pilot symbols with the magnitude of the reference pilot symbols inserted in the data sequences in frequency domain, the magnitudes of these red dots can be easily corrected making them converge to the QAM constellation point.

DC-OFDM also provides improved reliability in frequency-selective fading channels because each data symbol is transmitted with two subcarriers. This is achieved without sacrifice of throughput, as described above.

The scope of the claims should not be limited by the preferred embodiments set forth in the examples, but should be given the broadest interpretation consistent with the description as a whole.

What is claimed is:

1. A method for orthogonal frequency division multiplexing (OFDM) modulation comprising:
performing a bit-to-symbol operation on a data stream to generate a frequency-domain sequence of complex numbers;
separating the frequency-domain sequence of complex numbers into a first portion and a second portion that is disjoint with the first portion, each of the first portion and the second portion including a respective half of the complex numbers of the frequency-domain sequence; and
generating a time-domain sequence having a real in-phase component that is a function of the first portion only, and an imaginary quadrature-phase component that is a function of the second portion only;
wherein generating the time-domain sequence comprises pre-encoding the frequency-domain sequence to generate a pre-encoded frequency-domain sequence and performing an inverse discrete Fourier transform (IDFT) operation on the pre-encoded frequency-domain sequence to generate the time-domain sequence; and
wherein, when the IDFT operation is performed with a frequency offset equal to half of the subcarrier space, pre-encoding the frequency-domain sequence comprises:
expanding the first portion by generating a first conjugate symmetric sequence based on the first portion;
expanding the second portion by generating a second conjugate symmetric sequence based on the second portion; and
combining the first conjugate symmetric sequence as a real component of the pre-encoded frequency-domain sequence and the second conjugate symmetric sequence as an imaginary component of the pre-encoded frequency-domain sequence.

2. The method according to claim 1, wherein the frequency-domain sequence associated with a plurality of users, the method further comprising:
assigning the complex numbers of the frequency-domain sequence to subcarriers such that both subcarriers of a pair of symmetric subcarriers are assigned to a same user of the plurality of users; and
for each pair of symmetric subcarriers allocated to one of the plurality of users, modulating one subcarrier of the pair of symmetric subcarriers utilizing a first complex number of the frequency-domain sequence and modulating the other subcarrier of the pair of symmetric subcarriers utilizing a conjugate of the first complex symbol.

3. The method according to claim 2, wherein assigning the complex numbers comprises utilizing a first set of complex numbers associated with a first group of users of the plurality of users to generate a real component of the time-domain sequence, and utilizing a second set of complex numbers associated with a second group of users of the plurality of users, the second group comprising users not in the first group, to generate an imaginary component of the time-domain sequence.

4. The method according to claim 2, wherein assigning the complex numbers comprises assigning the complex numbers of the plurality of users to the subcarriers according to a first allocation plan for generating the in-phase component of the time-domain sequence; and
assigning the complex numbers of the plurality of users to the subcarriers according to a second allocation plan that is different from the first allocation plan for generating the quadrature-phase component of the time-domain sequence.

5. A method for orthogonal frequency division multiplexing (OFDM) modulation comprising:
performing a bit-to-symbol operation on a data stream to generate a frequency-domain sequence of complex numbers;
separating the frequency-domain sequence of complex numbers into a first portion and a second portion that is disjoint with the first portion, each of the first portion and the second portion including a respective half of the complex numbers of the frequency-domain sequence; and
generating a time-domain sequence having a real in-phase component that is a function of the first portion only, and an imaginary quadrature-phase component that is a function of the second portion only;
wherein generating the time-domain sequence comprises pre-encoding the frequency-domain sequence to generate a pre-encoded frequency-domain sequence and performing an inverse discrete Fourier transform (IDFT) operation on the pre-encoded frequency-domain sequence to generate the time-domain sequence; and
wherein, when the IDFT operation is performed without frequency offset, pre-encoding the frequency-domain sequence comprises:
expanding the first portion by removing a first imaginary part of the $0^{th}$ element of the first portion, including the first imaginary part as a new element after a last element of the first portion, and generating a first conjugate symmetric sequence based on the elements of the first portion other than the $0^{th}$ element and the new element of the first portion;
expanding the second portion by removing a second imaginary part of the $0^{th}$ element of the second portion, including the second imaginary part as a new element after the elements of the second portion, and generating a second conjugate symmetric sequence based on the elements of the second portion other than the $0^{th}$ element and the new element of the second portion; and
combining the first conjugate symmetric sequence as a real component of the pre-encoded frequency-domain sequence and the second conjugate symmetric sequence as an imaginary component of the pre-encoded frequency-domain sequence.

6. A method for orthogonal frequency division multiplexing (OFDM) modulation comprising:
performing a bit-to-symbol operation on a data stream to generate a frequency-domain sequence of complex numbers;
separating the frequency-domain sequence of complex numbers into a first portion and a second portion that is disjoint with the first portion, each of the first portion and the second portion including a respective half of the complex numbers of the frequency-domain sequence; and
generating a time-domain sequence having a real in-phase component that is a function of the first portion only, and an imaginary quadrature-phase component that is a function of the second portion only;

wherein generating the time-domain sequence comprises pre-encoding the frequency-domain sequence to generate a pre-encoded frequency-domain sequence and performing an inverse discrete Fourier transform (IDFT) operation on the pre-encoded frequency-domain sequence to generate the time-domain sequence;

wherein generating the time-domain sequence comprises:

generating a first time sequence of real numbers based on the first portion;

generating a second time sequence of real numbers based on the second portion; and combining the first time sequence as the in-phase component of the time-domain sequence and the second time sequence as the quadrature-phase component of the time-domain; and wherein generating one of the first time sequence and the second time sequence comprises:

expanding the one of the first portion and the second portion by generating an conjugate symmetric sequence of the one of the first portion and the second portion;

performing an IDFT operation on the conjugate symmetric sequence; and wherein the IDFT operation is performed with a frequency offset equal to half of a spacing between subcarriers.

* * * * *